(12) United States Patent
Xiao et al.

(10) Patent No.: US 9,042,926 B2
(45) Date of Patent: May 26, 2015

(54) METHOD FOR OBTAINING UPLINK TRANSMIT POWER CONTROL PARAMETER, BASE STATION, AND USER EQUIPMENT

(75) Inventors: Dengkun Xiao, Beijing (CN); Yi Ding, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 241 days.

(21) Appl. No.: 13/475,108

(22) Filed: May 18, 2012

(65) Prior Publication Data

US 2012/0238305 A1    Sep. 20, 2012

Related U.S. Application Data

(63) Continuation of application No. PCT/CN2010/078940, filed on Nov. 22, 2010.

(30) Foreign Application Priority Data

Nov. 20, 2009   (CN) .......................... 2009 1 0221548

(51) Int. Cl.
*H04B 7/00*  (2006.01)
*H04W 52/40*  (2009.01)
(Continued)

(52) U.S. Cl.
CPC ............ *H04W 52/40* (2013.01); *H04W 52/146* (2013.01); *H04W 52/242* (2013.01); *H04W 52/283* (2013.01)

(58) Field of Classification Search
CPC ............ H04W 52/146; H04W 52/242; H04W 52/283; H04W 52/40
USPC .................................................. 455/522, 507
See application file for complete search history.

(56) References Cited

U.S. PATENT DOCUMENTS

| 7,031,742 B2 * | 4/2006 | Chen et al. ..................... 455/522 |
| 2007/0173279 A1 * | 7/2007 | Kuroda et al. ................ 455/522 |

(Continued)

FOREIGN PATENT DOCUMENTS

| CN | 101166349 | 4/2008 |
| CN | 101359938 | 2/2009 |

(Continued)

OTHER PUBLICATIONS

"Uplink Coordinated Multi-Point Reception with Distributed Inter-Cell Interference Suppression for LTE-A", 3GPP TSG RAN WG1 Meeting #57, San Francisco, CA, USA, May 4-8, 2009, pp. 1-4.

(Continued)

*Primary Examiner* — Simon Nguyen
(74) *Attorney, Agent, or Firm* — Staas & Halsey LLP

(57) ABSTRACT

The present invention provides a method for obtaining an uplink transmit power control parameter, where the method is applicable to a radio communication system using a CoMP transmission technology and includes: obtaining, by an base station, a downlink path loss of a serving cell serving for a UE and a sum of a each difference between a downlink path loss of each coordinated cell serving for the UE and the downlink path loss of the serving cell; obtaining, by the base station, a downlink path loss of the UE in a coordinated multi-point transmission environment and a transmit power control command of the UE in the coordinated multi-point transmission environment according to the downlink path loss of the serving cell and the sum of differences between downlink path losses. Thereby, the reduction of cell throughput and waste of UE power consumption is avoided.

19 Claims, 5 Drawing Sheets

```
A base station obtains a downlink path loss of a serving cell of
a UE and a sum of a difference between a downlink path loss     — S101
of each coordinated cell serving the UE and the downlink path
             loss of the serving cell

↓

The base station obtains a downlink path loss of the UE in a
CoMP transmission environment and a transmit power control      — S102
command of the UE in the CoMP transmission environment
according to the downlink path loss of the serving cell and the
sum of differences between the downlink path losses
```

(51) Int. Cl.
*H04W 52/14* (2009.01)
*H04W 52/24* (2009.01)
*H04W 52/28* (2009.01)

(56) References Cited

U.S. PATENT DOCUMENTS

| | | | |
|---|---|---|---|
| 2008/0166976 A1* | 7/2008 | Rao | 455/69 |
| 2009/0170548 A1* | 7/2009 | Soliman | 455/522 |
| 2010/0177721 A1* | 7/2010 | Simonsson et al. | 370/329 |
| 2010/0246705 A1* | 9/2010 | Shin et al. | 375/267 |
| 2010/0331037 A1* | 12/2010 | Jen | 455/522 |
| 2011/0171992 A1* | 7/2011 | Seo et al. | 455/522 |
| 2011/0222416 A1* | 9/2011 | Damnjanovic et al. | 370/252 |
| 2011/0255515 A1* | 10/2011 | Maeda et al. | 370/331 |
| 2011/0281525 A1* | 11/2011 | Furuskar et al. | 455/67.11 |
| 2012/0176998 A1* | 7/2012 | Muellner et al. | 370/329 |
| 2012/0202554 A1* | 8/2012 | Seo et al. | 455/522 |

FOREIGN PATENT DOCUMENTS

| | | |
|---|---|---|
| CN | 101527958 | 9/2009 |
| JP | 2006-262502 | 9/2006 |
| JP | 2010-516184 | 5/2010 |
| WO | 2007/044316 | 4/2007 |
| WO | 2010/124725 | 11/2010 |
| WO | 2010/150807 | 12/2010 |

OTHER PUBLICATIONS

"LTE; Evolved Universal Terrestrial Radio Access (E-UTRA); Physical Layer Procedures 3GPP TS 36.213 Version 8.7.0 Release 8", Technical Specification, Jun. 2009.
Chinese Office Action issued on Aug. 31, 2012 in corresponding Chinese Patent Application No. 200910221548.8.
Supplemental European Search Report issued on Sep. 19, 2012 in corresponding European Patent Application No. 10831156.4.
International Search Report of Corresponding PCT Application PCT/CN2010/078940 mailed Mar. 3, 2011.
Office Action, dated May 23, 2013, in corresponding Chinese App. No. 200910221548.8 (8 pp.).
"3$^{rd}$ Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009, pp. 1-77.
International Search Report mailed Mar. 3, 2011 issued in corresponding International Patent Application No. PCT/CN2010/078940.
Written Opinion of the International Searching Authority mailed Mar. 3, 2011 issued in corresponding International Patent Application No. PCT/CN2010/078940.

* cited by examiner

METHOD FOR OBTAINING UPLINK TRANSMIT POWER CONTROL PARAMETER, BASE STATION, AND USER EQUIPMENT

CROSS-REFERENCE TO RELATED APPLICATIONS

This application is a continuation of International Application No. PCT/CN2010/078940, filed on Nov. 22, 2010, which claims priority to Chinese Patent Application No. 200910221548.8, filed on Nov. 20, 2009, both of which are hereby incorporated by reference in their entireties.

FIELD OF THE INVENTION

The present invention relates to radio communication technologies, and in particular, to a method for obtaining an uplink transmit power control parameter, a base station, and a user equipment (UE, User Equipment).

BACKGROUND OF THE INVENTION

In a long-term evolution (LTE, Long-Term Evolution) system, before sending an uplink radio signal, a UE needs to obtain transmit power of the uplink radio signal (uplink transmit power for short). Before obtaining the uplink transmit power, the UE needs to obtain uplink transmit power control parameters, and obtains the uplink transmit power according to the uplink transmit power control parameters, where the uplink transmit power control parameters include uplink transmit power control parameters such as a downlink path loss (PL, Path Loss), a cell-specific power parameter, and a transmit power control (TPC, Transmit Power Control) command, some of which are provided by an base station. After the UE obtains these uplink transmit power control parameters, it may obtain the uplink transmit power according to these uplink transmit power control parameters.

In the prior art, as for the uplink transmit power control parameters, only a scenario factor of one serving cell of the UE is considered, but it is not considered how to determine the uplink transmit power control parameters in a coordinated multi-point (CoMP, Coordinated Multi-point) transmission scenario. If the uplink transmit power control parameters in the LTE system are still used to determine the uplink transmit power, reduction of cell throughput and consumption of UE power are caused.

SUMMARY OF THE INVENTION

Embodiments of the present invention provide a method for obtaining an uplink transmit power control parameter, an base station, and a UE to avoid reduction of cell throughput and waste of UE power consumption.

In one aspect, a method for obtaining an uplink transmit power control parameter is provided, is applicable to a radio communication system using a CoMP transmission technology, and includes:

obtaining, by an base station, a downlink path loss of a serving cell serving for a UE and a sum of a each difference between a downlink path loss of each coordinated cell serving for the UE and the downlink path loss of the serving cell; and obtaining, by the base station, a downlink path loss of the UE in a CoMP transmission environment and a transmit power control command of the UE in the coordinated multi-point transmission environment, according to the downlink path loss of the serving cell and the sum of differences between the downlink path losses.

In one aspect, a base station is provided, is applicable to a radio communication system using a CoMP transmission technology, and includes:

a first obtaining unit, configured to obtain a downlink path loss of a serving cell serving for a UE and a sum of a each difference between a downlink path loss of each coordinated cell serving for the UE and the downlink path loss of the serving cell; and a second obtaining unit, configured to obtain a downlink path loss of the UE in a CoMP transmission environment and a transmit power control command of the UE in the coordinated multi-point transmission environment, according to the downlink path loss of the serving cell and the sum of differences between the downlink path losses.

The base station obtains the downlink path loss of the UE in the CoMP transmission environment and the transmit power control command of the UE in the CoMP transmission environment, according to the downlink path loss of the serving cell and the sum of a each difference between a downlink path loss of each coordinated cell and the downlink path loss of the serving cell. That is, when determining the downlink path loss of the UE in the CoMP transmission environment and the transmit power control command of the UE in the CoMP transmission environment, the base station considers factors such as the downlink path loss of the serving cell and the downlink path loss of the coordinated cell. As can be known above, embodiments of the present invention provide a technical solution to how to determine the downlink path loss of the UE in the CoMP transmission environment and the transmit power control command of the UE in the CoMP transmission environment in a CoMP transmission scenario. Thereby, the reduction of cell throughput and waste of UE power consumption is avoided.

In one aspect, another method for an obtaining uplink transmit power control parameter is provided, is applicable to a radio communication system using a CoMP transmission technology, and includes:

determining, by an base station, a location of a first UE in a serving cell serving for the first UE, and obtaining a CoMP set selection threshold that is configured by a network system and received by the first UE; and obtaining, by the base station, an uplink transmit power control parameter of the first UE in a CoMP transmission environment according to a mapping relationship between a pre-stored location of a UE in a cell, a CoMP set selection threshold configured by the network system, and a uplink transmit power control parameter of the UE in the CoMP transmission environment, or obtaining, by the base station, a difference between an uplink transmit power control parameter of the serving cell serving for the first UE and the uplink transmit power control parameter of the first UE in the CoMP transmission environment according to a mapping relationship between the pre-stored location of the UE in the cell, the CoMP set selection threshold configured by the network system, and the difference between the uplink transmit power control parameter of the serving cell serving for the first UE and the uplink transmit power control parameter of the first UE in the CoMP transmission environment, where the uplink transmit power control parameter of the UE in the CoMP transmission environment is determined according to the uplink transmit power control parameter of the serving cell serving for the UE and a sum of a each difference between an uplink transmit power control parameter of an coordinated cell serving for the UE and the uplink transmit power control parameter of the serving cell.

In one aspect, another base station is provided, is applicable to a radio communication system using a CoMP transmission technology, and includes:

a determining unit, configured to determine a location of a first UE in a serving cell serving for the first UE; a first obtaining unit, configured to obtain a CoMP set selection threshold that is configured by a network system and received by the first UE; and a second obtaining unit, configured to obtain an uplink transmit power control parameter of the first UE in a CoMP transmission environment according to a mapping relationship between a pre-stored location of a UE in a cell, a CoMP set selection threshold configured by the network system, and an uplink transmit power control parameter of the UE in the CoMP transmission environment, or obtain a difference between an uplink transmit power control parameter of the serving cell serving for the first UE and the uplink transmit power control parameter of the first UE in the CoMP transmission environment according to a mapping relationship between the pre-stored location of the UE in the cell, the CoMP set selection threshold configured by the network system, and the difference between the uplink transmit power control parameter of the serving cell serving for the first UE and the uplink transmit power control parameter of the first UE in the CoMP transmission environment, where the uplink transmit power control parameter of the UE in the CoMP transmission environment is determined according to the uplink transmit power control parameter of the serving cell serving for the UE and a sum of a each difference between an uplink transmit power control parameter of an coordinated cell serving for the UE and the uplink transmit power control parameter of the serving cell.

In the foregoing embodiment of the method for obtaining an uplink transmit power control parameter and the embodiment of the base station, the base station obtains the uplink transmit power control parameter of the first UE in the CoMP transmission environment according to the mapping relationship between the pre-stored location of the UE in the cell, the CoMP set selection threshold configured by the network system, and the uplink transmit power control parameter of the UE in the CoMP transmission environment, or obtains the difference between the uplink transmit power control parameter of the serving cell and the uplink transmit power control parameter of the first UE in the CoMP transmission environment according to the mapping relationship between the pre-stored location of the UE in the cell, the CoMP set selection threshold configured by the network system, and the difference between the uplink transmit power control parameter of the serving cell and the uplink transmit power control parameter of the UE in the CoMP transmission environment, where the uplink transmit power control parameter of the UE in the CoMP transmission environment is determined according to the uplink transmit power control parameter of the serving cell and a sum of a each difference between an uplink transmit power control parameter of an coordinated cell and the uplink transmit power control parameter of the serving cell. That is, when determining the uplink transmit power control parameter of the UE in the CoMP transmission environment or the difference between the uplink transmit power control parameter of the serving cell and the uplink transmit power control parameter of the first UE in the CoMP transmission environment, the base station considers factors such as the uplink transmit power control parameter of the serving cell and uplink transmit power control parameter of the coordinated cell. As can be known above, the embodiments of the present invention provide a technical solution on how to determine the uplink transmit power control parameter of the UE in the CoMP transmission environment or the difference between the uplink transmit power control parameter of the serving cell and the uplink transmit power control parameter of the first UE in the CoMP transmission environment in a CoMP transmission scenario. Thereby, the reduction of cell throughput and waste of UE power consumption is avoided.

In one aspect, another method for obtaining an uplink transmit power control parameter is provided, is applicable to a radio communication system using the CoMP transmission technology, and includes: obtaining, by a UE, a cell-specific power parameter provided by each access point, where each access point are a access point serving for the UE; and selecting, by the UE from all the obtained cell-specific power parameters, a cell-specific power parameter as an actually used cell-specific power parameter.

In one aspect, a UE is provided, is applicable to a radio communication system using the CoMP transmission technology, and includes:

an obtaining unit, configured to obtain a cell-specific power parameter provided by each access point, where each access point is a access point serving for the UE; and a selecting unit, configured to select, from all the obtained cell-specific power parameters, a cell-specific power parameter as an actually used cell-specific power parameter.

In the foregoing embodiment of the method for obtaining an uplink transmit power control parameter and the embodiment of the UE, the UE selects, from all the obtained cell-specific power parameters, a cell-specific power parameter as the actually used cell-specific power parameter, which solves a problem how to determine the actually used cell-specific power parameter in a CoMP transmission environment. As can be known above, the embodiments of the present invention provide a technical solution for determining an actually used cell-specific power parameter in a CoMP transmission environment. Thereby, the reduction of cell throughput and waste of UE power consumption is avoided.

BRIEF DESCRIPTION OF THE DRAWINGS

To illustrate the technical solutions in embodiments of the present invention more clearly, accompanying drawings used in the description of the embodiments of the present invention is briefly introduced in the following. Evidently, the accompanying drawings are only some embodiments of the present invention, and persons of ordinary skill in the art can derive other drawings from these accompanying drawings without creative efforts.

DETAILED DESCRIPTION OF THE EMBODIMENTS

Figure 1:
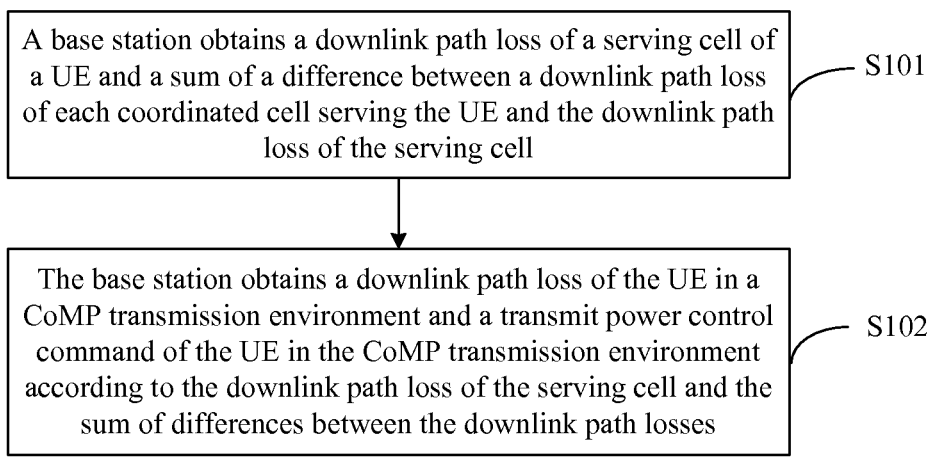
FIG. 1 is a flowchart of a method for obtaining an uplink transmit power control parameter according to an embodiment of the present invention.

The technical solutions provided in embodiments of the present invention are hereinafter described clearly and completely with reference to the accompanying drawings. Apparently, the embodiments described below are only part rather than all of the embodiments of the present invention. All other embodiments that persons of ordinary skill in the art obtain based on the embodiments of the present invention without creative efforts fall within the protection scope of the present invention.

To enable those skilled in the art to understand the following embodiments clearly, technical knowledge related to embodiments of the present invention is described in the following first.

At present, some communication systems use a coordinated multi-point (COMP, Coordinated Multi-point) transmission technology, for example, a long-term evolution advanced (LTE-A, Long-Term Evolution Advanced) system.

The CoMP transmission technology is one of critical technologies of the LTE-A, and can improve the performance of a radio communication system and increase throughput of a cell-edge UE. This is because in a multi-cell environment, a frequency reuse technology used by the LTE system introduces inter-cell interference, but reduces the performance of the cell-edge UE and average throughput of the cell. However, the CoMP transmission technology can convert the inter-cell interference into useful signals, which greatly reduces interference on the cell-edge UE.

The CoMP transmission technology is classified as two types. One type is joint processing, Joint Processing, including joint transmission and dynamic cell selection. The joint transmission means that data can be sent at any access point (AP, Access Point) in a CoMP set and that multiple access points can send data to a UE concurrently. The dynamic cell selection means that the access point varies according to the CoMP set and the selected cell may become an access point at any subframe. The other type is coordinated scheduling/beamforming, Coordinated Scheduling/Beamforming For this type of CoMP, data can be transmitted only in a serving cell, and other cells in the CoMP set avoid interference through a scheduling/beamforming decision.

In a CoMP transmission scenario, one UE may be served by multiple cells concurrently, and the cells serving for the UE concurrently may be called a CoMP set. In addition, each cell serving for the UE may be considered as an access point.

Before the UE obtains uplink transmit power, it needs to obtain uplink transmit power control parameters, including a downlink path loss, a cell-specific power parameter, and a transmit power control command. However, in the prior art, in a CoMP transmission scenario, if the uplink transmit power control parameters in the LTE system are still used to determine uplink transmit power, reduction of the cell throughput and consumption of the UE power may be caused.

Embodiments of the present invention provide a method for obtaining an uplink transmit power control parameter.

Each of the following embodiments is applicable to a radio communication system using the CoMP transmission technology.

The following firstly describes a method for obtaining an uplink transmit power control parameter according to an embodiment of the present invention. As shown in FIG. 1, the method includes:

S101. A base station obtains a downlink path loss of a serving cell serving for a UE and a sum of a each difference between a downlink path loss of each coordinated cell serving for the UE and the downlink path loss of the serving cell.

S102. The base station obtains a downlink path loss of the UE in a CoMP transmission environment and a transmit power control command of the UE in the CoMP transmission environment according to the downlink path loss of the serving cell and the sum of differences between the downlink path losses.

In practical applications, the base station may also obtain a sum of a reception signal to interference plus noise ratio (SINR, Signal to Interference plus Noise Ratio) of each access point serving for the UE, a sum of strength of an interference signal on a signal that the UE sends to an access point of each cell, the number of resource blocks allocated to the UE, a sum of a cell-specific power parameter and an UE-specific power parameter, and a transmit power control command of the serving cell serving for the UE. In this case, the base station may obtain the downlink path loss of the UE in the CoMP transmission environment in the following manner:

$$PL^* = \frac{1}{\alpha(j)} \cdot \left\{ PL_1 - \left[ C - \frac{1}{n}(\gamma + \Delta + I) \right] \right\},$$

where, $PL^*$ is the downlink path loss of the UE in the CoMP transmission environment, $\alpha(j)$ is the cell-specific parameter, $PL_1$ is the downlink path loss of the serving cell, n is the number of cells serving for the UE, $\gamma$ is a sum of a reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where, $C=10 \log_{10}(M_{PUSCH}(i))+P^*_{O\_NOMINAL\_PUSCH}(j)+f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command, i is a subframe number, and j is a control variable.

After the base station obtains the downlink path loss of the UE in the CoMP transmission environment, the base station may further obtain a difference between the downlink path loss of the serving cell and the downlink path loss of the UE in the CoMP transmission environment. Then, the base station may provide the UE with the difference between the downlink path loss of the serving cell and the downlink path loss of the UE in the CoMP transmission environment.

In practical applications, the base station may further obtain the sum of the reception signal to interference plus noise ratios of all access points serving for the UE, the sum of strength of the interference signal on the signal that the UE sends to the access point of each cell, the number of resource blocks allocated to the UE, and the sum of the cell-specific power parameter and the UE-specific power parameter. In this case, the base station may obtain the transmit power control command of the UE in the CoMP transmission environment in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where C=10 $\log_{10}$ ($M_{PUSCH}(i)$)+$P^*_{O\_PUSCH}(j)$+α(j)·PL*, where $M_{PUSCH}(i)$ is the number of resource blocks allocated to the UE, $P^*_{O\_NOMINAL\_PUSCH}(j)$ is the cell-specific power parameter the value of which is the smallest among the cell-specific power parameters of all cells serving for the UE, α(j) is a cell-specific parameter, PL* is the downlink path loss of the UE in the CoMP transmission environment, i is the subframe number, and j is the control variable.

In practical applications, the base station may firstly obtain the downlink path loss of the UE in the CoMP transmission environment, and then obtain the transmit power control command of the UE in the CoMP transmission environment.

After the base station obtains the transmit power control command of the UE in the CoMP transmission environment, the base station may further obtain a difference between the transmit power control command of the serving cell serving for the UE and the transmit power control command of the UE in the CoMP transmission environment. Then, the base station may provide the UE with the difference between the transmit power control command of the serving cell and the transmit power control command of the UE in the CoMP transmission environment.

Figure 2:
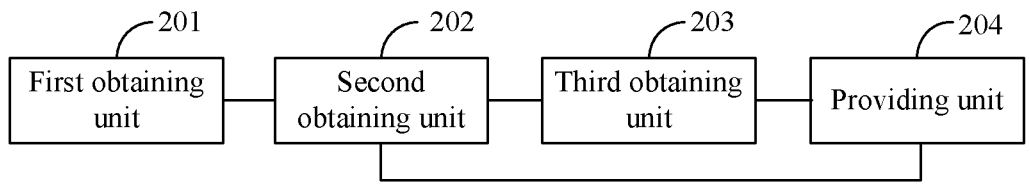
FIG. 2 is a schematic diagram of a logical structure of a base station according to an embodiment of the present invention.

Corresponding to the method shown in FIG. 1, an embodiment of the present invention further provides an base station. As shown in FIG. 2, the base station includes: a first obtaining unit 201, configured to obtain a downlink path loss of a serving cell serving for a UE and a sum of a each difference between downlink path loss of each coordinated cell serving for the UE and the downlink path loss of the serving cell; and a second obtaining unit 202, configured to obtain a downlink path loss of the UE in a CoMP transmission environment and a transmit power control command of the UE in the CoMP transmission environment according to the downlink path loss of the serving cell and the sum of differences between the downlink path losses, where the downlink path loss of the serving cell and the sum of differences between the downlink path losses are obtained by the first obtaining unit 201.

In practical applications, the first obtaining unit 201 may also obtain a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a transmit power control command of the serving cell serving for the UE. In this case, the second obtaining unit 202 may obtain the downlink path loss of the UE in the CoMP transmission environment in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss of the UE in the CoMP transmission environment, α(j) is a cell-specific parameter, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of an interference signal on a signal that the UE sends to the access point of each cell, where, C=10 $\log_{10}$($M_{PUSCH}(i)$)+$P^*_{O\_NOMINAL\_PUSCH}(j)$+f (i), where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is a subframe number, and j is a control variable.

The base station may further include: a third obtaining unit 203, configured to obtain a difference between the downlink path loss of the serving cell and the downlink path loss of the UE in the CoMP transmission environment after the second obtaining unit 202 obtains the downlink path loss of the UE in the CoMP transmission environment; and a providing unit 204, configured to provide the UE with the difference between the downlink path loss of the serving cell and the downlink path loss of the UE in the CoMP transmission environment.

In practical applications, the first obtaining unit 201 may further obtain the sum of the reception signal to interference plus noise ratios of all access points serving for the UE, the sum of strength of an interference signal on a signal that the UE sends to the access point of each cell, the number of resource blocks allocated to the UE, and the sum of the cell-specific power parameter and the user equipment-specific power parameter. In this case, the second obtaining unit 202 may obtain the transmit power control command of the UE in the CoMP transmission environment in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where C=10 $\log_{10}$ ($M_{PUSCH}(i)$)+$P^*_{O\_PUSCH}(j)$+α(j)·PL*, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, α(j) is the cell-specific parameter, PL* is the downlink path loss of the UE in the CoMP transmission environment, i is the subframe number, and j is the control variable.

In practical applications, the second obtaining unit 202 may firstly obtain the downlink path loss of the UE in the CoMP transmission environment, and then obtain the transmit power control command of the UE in the CoMP transmission environment.

The base station may further include: a third obtaining unit 203, configured to obtain a difference between the transmit power control command of the serving cell serving for the UE and the transmit power control command of the UE in the CoMP transmission environment after the second obtaining unit 202 obtains the transmit power control command of the UE in the CoMP transmission environment; and a providing unit 204, configured to provide the UE with the difference between the transmit power control command of the serving cell and the transmit power control command of the UE in the CoMP transmission environment. It should be noted that the third obtaining unit 203 herein may be the same as the foregoing third obtaining unit 203 configured to obtain the difference between the downlink path loss of the serving cell and the downlink path loss of the UE in the CoMP transmission environment. Similarly, the providing unit 204 herein may be the same as the foregoing providing unit 204 configured to provide the UE with the difference between the downlink path loss of the serving cell and the downlink path loss of the UE in the CoMP transmission environment.

Figure 3:
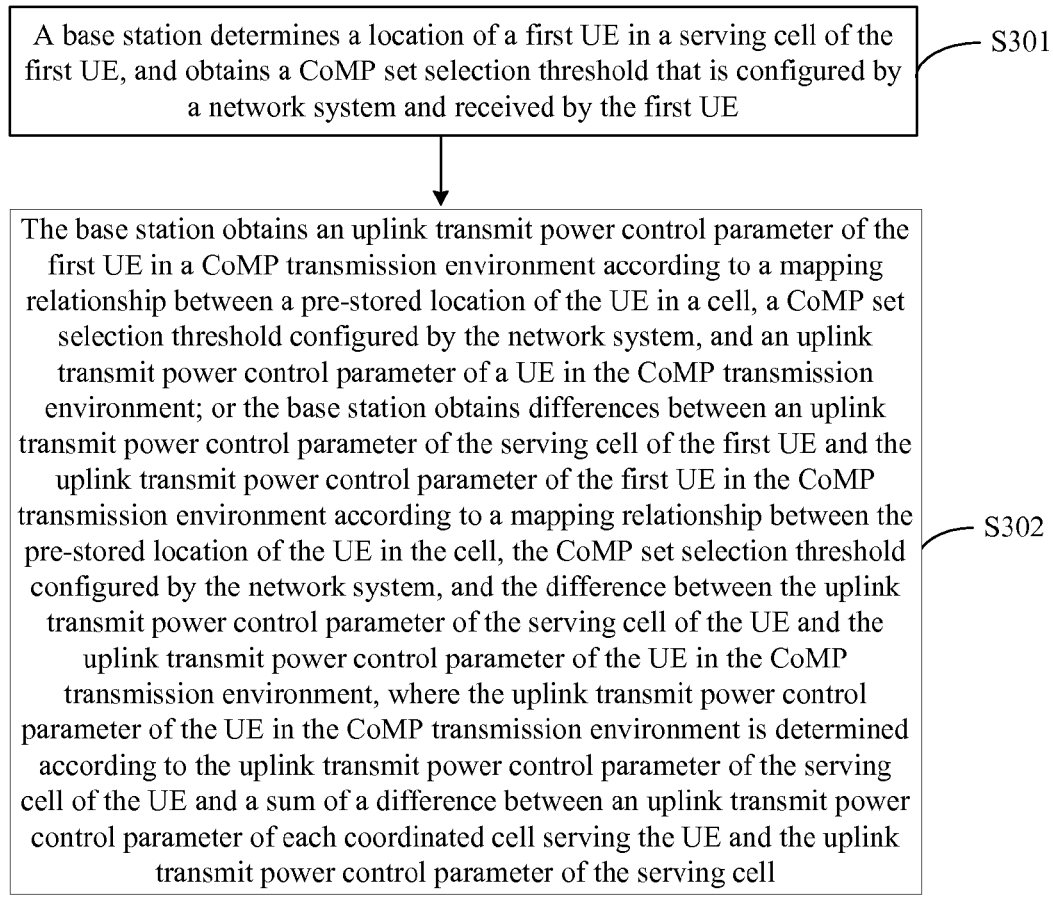
FIG. 3 is a flowchart of a method for obtaining an uplink transmit power control parameter according to an embodiment of the present invention.

The following introduces another method for obtaining an uplink transmit power control parameter according to an embodiment of the present invention. As shown in FIG. 3, the method includes:

S301. A base station determines a location of a first UE in a serving cell serving for the first UE, and obtains a CoMP set selection threshold configured by a network system and received by the first UE.

S302. The base station obtains an uplink transmit power control parameter of the first UE in a CoMP transmission environment according to a mapping relationship between a pre-stored location of a UE in a cell, a CoMP set selection threshold configured by the network system, and an uplink transmit power control parameter of the UE in the CoMP transmission environment; or the base station obtains a difference between an uplink transmit power control parameter of the serving cell serving for the first UE and the uplink transmit power control parameter of the first UE in the CoMP transmission environment according to a mapping relationship between the pre-stored location of the UE in the cell, the CoMP set selection threshold configured by the network system, and the difference between the uplink transmit power control parameter of the serving cell serving for the UE and the uplink transmit power control parameter of the UE in the CoMP transmission environment, where the uplink transmit power control parameter of the UE in the CoMP transmission environment is determined according to the uplink transmit power control parameter of the serving cell serving for the UE and a sum of a each difference between an uplink transmit power control parameter of an coordinated cell serving for the UE and the uplink transmit power control parameter of the serving cell.

In practical applications, the uplink transmit power control parameter may refer to a downlink path loss. The downlink path loss of the UE in the CoMP transmission environment may be determined according to a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a transmit power control command of the serving cell serving for the UE. In this case, the downlink path loss of the UE in the CoMP transmission environment may be determined in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss of the UE in the CoMP transmission environment, α(j) is a cell-specific parameter, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of an interference signal on a signal that the UE sends to the access point of each cell, where, C=10 $\log_{10}(M_{PUSCH}(i))+P^*_{O\_NOMINAL\_PUSCH}(j)+f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is a subframe number, and j is a control variable.

In practical applications, the uplink transmit power control parameter may also refer to a transmit power control command. The transmit power control command of the UE in the CoMP transmission environment may be determined according to the sum of the reception signal to interference plus noise ratios of all access points serving for the UE, the sum of strength of the interference signal on the signal that the UE sends to the access point of each cell, the number of resource blocks allocated to the UE, the sum of the cell-specific power parameter and the user equipment-specific power parameter, and the downlink path loss of the UE in the CoMP transmission environment. In this case, the transmit power control command of the UE in the CoMP transmission environment may be determined in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where C=10 $\log_{10}(M_{PUSCH}(i))+P^*_{O\_PUSCH}(j)+\alpha(j)\cdot PL^*$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, α(j) is the cell-specific parameter, PL* is the downlink path loss of the UE in the CoMP transmission environment, i is the subframe number, and j is the control variable.

In practical applications, the base station may firstly obtain the downlink path loss of the UE in the CoMP transmission environment, and then obtain the transmit power control command of the UE in the CoMP transmission environment.

After the base station obtains the uplink transmit power control parameter of the first UE in the CoMP transmission environment, it may further provide the first UE with the uplink transmit power control parameter of the first UE in the CoMP transmission environment; or, after the base station obtains a difference between the uplink transmit power control parameter of the serving cell serving for the first UE and the uplink transmit power control parameter of the first UE in the CoMP transmission environment, it may further provide the first UE with the difference between the uplink transmit power control parameter of the serving cell serving for the first UE and the uplink transmit power control parameter of the first UE in the CoMP transmission environment.

Figure 4:
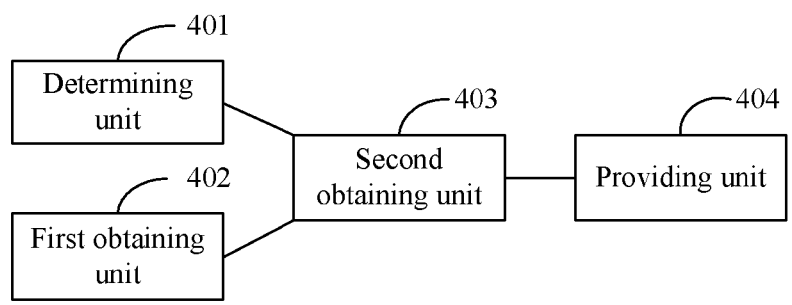
FIG. 4 is a schematic diagram of a logical structure of a base station according to an embodiment of the present invention.

Corresponding to the method shown in FIG. 3, an embodiment of the present invention also provides an base station. As shown in FIG. 4, the base station includes: a determining unit 401, configured to determine a location of a first UE in a serving cell serving for the first UE; a first obtaining unit 402, configured to obtain a CoMP set selection threshold that is configured by a network system and received by the first UE; and a second obtaining unit 403, configured to obtain an uplink transmit power control parameter of the first UE in a CoMP transmission environment according to a mapping relationship between a pre-stored location of a UE in a cell, a CoMP set selection threshold configured by the network system, and an uplink transmit power control parameters of a UE in the CoMP transmission environment, and according to the CoMP set selection threshold that is configured by the network system, received by the first UE and obtained by the first obtaining unit 402, and the location of the first UE in the serving cell, where the location of the first UE in the serving cell is determined by the determining unit 401, or, the second obtaining unit 403 is configured to obtain a difference between an uplink transmit power control parameter of the serving cell serving for the first UE and the uplink transmit power control parameter of the first UE in the CoMP transmission environment according to a mapping relationship between the pre-stored location of the UE in the cell, the CoMP set selection threshold configured by the network system, and a difference between the uplink transmit power control parameter of the serving cell serving for the UE and the uplink transmit power control parameter of the UE in the CoMP transmission environment, and according to the CoMP set selection threshold that is configured by the network system, received by the first UE and obtained by the first obtaining unit 402, and the location of the first UE in the serving cell serving for the first UE, where the location of the first UE in the serving cell serving for the first UE is determined by the determining unit 401, where the uplink transmit power control parameter of the UE in the CoMP transmission environment is determined according to the uplink transmit power control parameter of the serving cell serving for the UE and a sum of a each difference between an uplink transmit power control parameter of an coordinated cell serving for the UE and the uplink transmit power control parameter of the serving cell.

In practical applications, the uplink transmit power control parameter may refer to a downlink path loss. The downlink path loss of the UE in the CoMP transmission environment may be determined according to a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a transmit power control command of the serving cell serving for the UE. In this case, the downlink path loss of the UE in the CoMP transmission environment may be determined in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss of the UE in the CoMP transmission environment, α(j) is a cell-specific parameter, $PL_1$ is a downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where, $C=10\log_{10}(M_{PUSCH}(i))+P^*_{O\_NOMINAL\_PUSCH}(j)+f(i)$, where $M_{PUSCH}$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is a subframe number, and j is a control variable.

In practical applications, the uplink transmit power control parameter may also refers to a transmit power control command. The transmit power control command of the UE in the CoMP transmission environment may be determined according to the sum of the reception signal to interference plus noise ratios of all access points serving for the UE, a sum of strength of an interference signal on a signal that the UE sends to an access point of each cell, the number of resource blocks allocated to the UE, the sum of the cell-specific power parameter and the user equipment-specific power parameter, and the downlink path loss of the UE in the CoMP transmission environment. In this case, the transmit power control command of the UE in the CoMP transmission environment may be determined in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where $C=10\log_{10}(M_{PUSCH}(i))+P^*_{O\_PUSCH}(j)+\alpha(j)\cdot PL^*$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, α(j) is the cell-specific parameter, PL* is the downlink path loss of the UE in the CoMP transmission environment, i is the subframe number, and j is the control variable.

In practical applications, the downlink path loss of the UE in the CoMP transmission environment may be determined firstly, and then the transmit power control command of the UE in the CoMP transmission environment is determined.

The base station may further include a providing unit 404 configured to provide the first UE with the uplink transmit power control parameter of the first UE in the CoMP transmission environment after the second obtaining unit 403 obtains the uplink transmit power control parameters of the first UE in the CoMP transmission environment, or provide the first UE with the difference between the uplink transmit power control parameter of the serving cell serving for the first UE and the uplink transmit power control parameter of the first UE in the CoMP transmission environment after the second obtaining unit 403 obtains the difference between the uplink transmit power control parameter of the serving cell serving for the first UE and the uplink transmit power control parameter of the first UE in the CoMP transmission environment.

The following illustrates in detail how to determine the downlink path loss and the transmit power control command according to an embodiment of the present invention.

Figure 5:
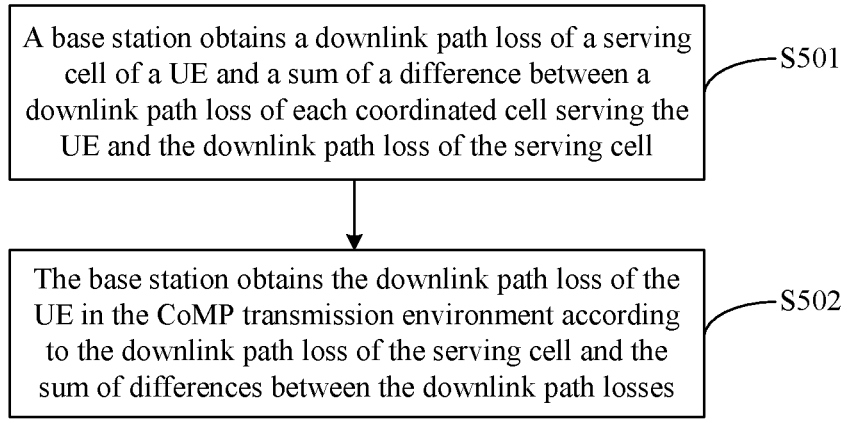
FIG. 5 is a flowchart of a method for obtaining an uplink transmit power control parameter according to an embodiment of the present invention.

The following firstly illustrates how to determine the downlink path loss according to an embodiment of the present invention. As shown in FIG. 5, a method for obtaining an uplink transmit power control parameter according to an embodiment of the present invention includes:

S501. A base station obtains a downlink path loss of a serving cell serving for a UE and a sum of the each difference between downlink path loss of each coordinated cell serving for the UE and the downlink path loss of the serving cell.

Because one UE may be served by multiple cells concurrently, the UE may obtain not only the downlink path loss of the serving cell serving for the UE but also a downlink path loss of each coordinated cell serving for the UE itself.

In practical applications, the UE may provide the base station with the path loss of the serving cell and path losses of all the coordinated cells. In this way, the base station not only obtains the path loss of the serving cell but also may obtain, according to the path loss of the serving cell and the path losses of all coordinated cells, a each difference between the downlink path loss of each coordinated cell and the downlink path loss of the serving cell. Finally, the base station adds up these differences to obtain the sum of the each difference between downlink path loss of each coordinated cell and the downlink path loss of the serving cell.

In practical applications, the UE may also firstly obtain the difference between the downlink path loss of each coordinated cell and the downlink path loss of the serving cell according to the path loss of the serving cell and the path losses of all coordinated cells, and then provide the base station with the path loss of the serving cell and these differences. In this way, the base station not only obtains the downlink path loss of the serving cell but also may obtain, according to these differences, the sum of the each difference between the downlink path loss of each coordinated cell and the downlink path loss of the serving cell.

In practical applications, the UE may also firstly obtain the difference between the downlink path loss of each coordinated cell and the downlink path loss of the serving cell according to the path loss of the serving cell and the path losses of all coordinated cells, and then add up these differences to obtain the sum of the each difference between the downlink path loss of each coordinated cell and the downlink path loss of the serving cell. Then the UE provides the NodeB with the downlink path loss of the serving cell and the sum of the each difference between the downlink path loss of each coordinated cell and the downlink path loss of the serving cell. In this way, the NodeB obtains the downlink path loss of the serving cell and the sum of the each difference between the downlink path loss of each coordinated cell and the downlink path loss of the serving cell.

It should be noted that the purpose of obtaining, by the base station, the downlink path loss of the serving cell and the sum of the each difference between the downlink path loss of each coordinated cell and the downlink path loss of the serving cell is to calculate the downlink path loss of the UE in the CoMP transmission environment. However, to ensure that the finally obtained downlink path loss of the UE in the CoMP transmission environment is more accurate and practical, in addition to obtaining the downlink path loss of the UE in the CoMP transmission environment according to the downlink path loss of the serving cell and the sum of the each difference between the downlink path loss of each coordinated cell and the downlink path loss of the serving cell, the base station may also obtain the downlink path loss of the UE in the CoMP transmission environment according to factors such as a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a transmit power control command of the serving cell serving for the UE. Therefore, in addition to obtaining the downlink path loss of the serving cell and the sum of the each difference between the downlink path loss of each coordinated cell and the downlink path loss of the serving cell, the base station may also obtain the sum of the reception signal to interference plus noise ratio of each access point serving for the UE, the sum of strength of the interference signal on the signal that the UE sends to the access point of each cell, the number of resource blocks allocated to the UE, the sum of the cell-specific power parameter and the user equipment-specific power parameter, and the transmit power control command of the serving cell serving for the UE.

S502. The base station obtains the downlink path loss of the UE in the CoMP transmission environment according to the downlink path loss of the serving cell and the sum of differences between the downlink path losses.

In practical applications, the base station may obtain the downlink path loss of the UE in the CoMP transmission environment in the following manner:

$$PL^* = \frac{1}{\alpha} \cdot \left\{ PL_1 - \left[ C - \frac{1}{n}(\gamma + \Delta + I) \right] \right\}, \quad \text{formula (1)}$$

where, PL* is the downlink path loss of the UE in the CoMP transmission environment, $\alpha(j)$ is a cell-specific parameter, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where, $C=10 \log_{10}(M_{PUSCH}(i))+P^*_{O\_NOMINAL\_PUSCH}(j)+f(i)$, where $M_{PUSCH}$ is the number of resource blocks allocated to the UE, $P^*_{O\_NOMINAL\_PUSCH}(j)$ is a cell-specific power parameter the value of which is the smallest among cell-specific power parameters of all cells serving for the UE, f(i) is the transmit power control command of the serving cell, i is a subframe number, and j is a control variable. It should be noted that a value set of $\alpha(j)$ may be {0, 0.1, 0.2, 0.3, 0.4, 0.5, 0.6, 0.7, 0.8, 0.9, 1}. The value of j being 0 corresponds to semi-continuous scheduling, the value of j being 1 corresponds to dynamic scheduling, α(j) corresponding to different values of j has different values.

The following illustrates how to obtain formula (1) according to the embodiment of the present invention, with an example in which three cells serve for one UE concurrently.

The following equations may be obtained in the CoMP transmission environment:

$$\begin{cases} \gamma_1 = P - PL_1 - I_1 \\ \gamma_2 = P - PL_2 - I_2 \\ \gamma_3 = P - PL_3 - I_3 \\ \gamma = \gamma_1 + \gamma_2 + \gamma_3 \end{cases}$$

where, $PL_1$ is the downlink path loss of the serving cell, $PL_2$ is a downlink path loss of a coordinated cell 1, $PL_3$ is a downlink path loss of a coordinated cell 2, $I_1$ is the strength of an interference signal on a signal that the UE sends to the access point of the serving cell, $I_2$ is the strength of an interference signal on a signal that the UE sends to the access point of the coordinated cell 1, $I_3$ is the strength of an interference signal on a signal that the UE sends to the access point of the coordinated cell 2, $\gamma$ is the sum of the reception signal to interference plus noise ratios of all access points serving for the UE and the combining of $\gamma$ is maximum ratio combining, and P is the uplink signal transmit power of the UE in the CoMP transmission environment. Because the influence of noise is small, it can be ignored here.

The following can be obtained through the foregoing equations:

$$\gamma = P - PL_1 - I_1 + P - PL_2 - I_2 + P - PL_3 - I_3$$
$$= 3P - (PL_1 + PL_2 + PL_3) - (I_1 + I_2 + I_3)$$

$$P = \frac{1}{3}[\gamma + (PL_1 + PL_2 + PL_3) + (I_1 + I_2 + I_3)]$$
$$= \frac{1}{3}[\gamma + PL_1 + (PL_1 + \Delta_1) + (PL_1 + \Delta_2) + (I_1 + I_2 + I_3)]$$
$$= \frac{1}{3}[\gamma + 3PL_1 + \Delta_1 + \Delta_2 + (I_1 + I_2 + I_3)]$$
$$= PL_1 + \frac{1}{3}[\gamma + \Delta_1 + \Delta_2 + (I_1 + I_2 + I_3)]$$

where, $\Delta_1 = PL_2 - PL_1$, and $\Delta_2 = PL_3 - PL_1$.

A formula of the uplink signal transmit power of the UE, where the formula is defined in 3GPP TS 36.213, is:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$$

$C = 10\log_{10}(M_{PUSCH}(i)) + P^*_{O\_PUSCH}(j) + \Delta_{TF}(i) + f(i)$ is defined, where $\Delta_{TF}(i)$ can be ignored due to an adaptive modulation and coding (AMC) technology, and $P^*_{O\_PUSCH}(j) = P^*_{O\_NOMINAL\_PUSCH}(j) + P_{O\_UE\_PUSCH}(j)$, where the cell-specific power parameter $P^*_{O\_NOMINAL\_PUSCH}(j)$ is the smallest value among $P^*_{O\_NOMINAL\_PUSCH}(j)$ of all cells in a CoMP set, the $P_{O\_UE\_PUSCH}(j)$ is set to 0, and f(i) is the f(i) of the serving cell.

$P = C + \alpha \cdot PL^*$ may be obtained according to the foregoing content.

Finally, the following may be obtained:

$$PL^* = \frac{1}{\alpha} \cdot (P - C)$$
$$= \frac{1}{\alpha} \cdot \left\{PL_1 + \frac{1}{3}[\gamma + \Delta_1 + \Delta_2 + (I_1 + I_2 + I_3)] - C\right\}$$
$$= \frac{1}{\alpha} \cdot \left\{PL_1 - \left[C - \frac{1}{3}(\gamma + \Delta_1 + \Delta_2 + I)\right]\right\}$$

where, $I = I_1 + I_2 + I_3$.

If the difference between the downlink path loss of the serving cell and the downlink path loss of the UE in the CoMP transmission environment needs to be obtained, the following may be obtained: $\Delta = PL_1 - PL^*$, where $\Delta$ is the difference between the downlink path loss of the serving cell and the downlink path loss of the UE in the CoMP transmission environment.

After the base station obtains the downlink path loss of the UE in the CoMP transmission environment, the base station may also provide the UE with the downlink path loss of the UE in the CoMP transmission environment. In this way, the UE obtains the downlink path loss in the CoMP transmission environment.

After the base station obtains the downlink path loss of the UE in the CoMP transmission environment, the base station may further obtain a difference between the downlink path loss of the serving cell and the downlink path loss of the UE in the CoMP transmission environment. Then, the base station provides the UE with the difference between the downlink path loss of the serving cell and the downlink path loss of the UE in the CoMP transmission environment. After the UE obtains the difference between the downlink path loss of the serving cell and the downlink path loss of the UE in the CoMP transmission environment, the UE may obtain the downlink path loss of the UE in the CoMP transmission environment because the UE is capable of obtaining the downlink path loss of the serving cell.

Corresponding to the method shown in FIG. 5, an embodiment of the present invention also provides an base station. For a logical structure of the base station, reference may be made to a logical structure shown in FIG. 2. As shown in FIG. 2, the base station includes: a first obtaining unit 201, configured to obtain a downlink path loss of a serving cell serving for a UE and a sum of a each difference between a downlink path loss of each coordinated cell serving for the UE and the downlink path loss of the serving cell; and a second obtaining unit 202, configured to obtain a downlink path loss of the UE in a CoMP transmission environment according to the downlink path loss of the serving cell and the sum of differences between the downlink path losses, where the downlink path loss of the serving cell and the sum of differences between the downlink path losses are obtained by the first obtaining unit 201.

Optionally, the first obtaining unit 201 may further obtain a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a transmit power control command of the serving cell serving for the UE.

The second obtaining unit 202 may obtain the downlink path loss of the UE in the CoMP transmission environment in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss parameter of the UE in an uplink transmit power formula of the UE in the CoMP transmission environment, α(j) is a cell-specific parameter, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on a signal that the UE sends to the access point of each cell, where, $C = 10 \log_{10}(M_{PUSCH}(i)) + P^*_{O\_NOMINAL\_PUSCH}(j) + f(i)$, is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is a subframe number, and j is a control variable.

Optionally, the base station may further include a providing unit 204 configured to provide the UE with the downlink path loss of the UE in the CoMP transmission environment after the second obtaining unit 202 obtains the downlink path loss of the UE in the CoMP transmission environment.

Optionally, the base station may further include a third obtaining unit 203 configured to obtain a difference between the downlink path loss of the serving cell and the downlink path loss of the UE in the CoMP transmission environment after the second obtaining unit 202 obtains the downlink path loss of the UE in the CoMP transmission environment. In this case, the providing unit 204 may provide the UE with the difference between the downlink path loss of the serving cell and the downlink path loss of the UE in the CoMP transmission environment.

For specific descriptions of the functions of each unit in the base station, reference may be made to related descriptions of the method provided in the embodiment shown in FIG. 5, and the details are not repeated herein.

In the method embodiment shown in FIG. 5 and the corresponding base station embodiment, the base station may determine, in real time, the downlink path loss or the difference between the downlink path losses. For example, when a UE needs to determine uplink signal transmit power, the base station determines the downlink path loss or the difference between the downlink path losses for the UE. In practical applications, a downlink path loss or a difference between downlink path losses, which is corresponding to a location of the UE in a cell, may be obtained in advance. When a UE needs to determine uplink signal transmit power, the base station may firstly determine a current location of the UE in a cell, and then obtain a downlink path loss or a difference between downlink path losses according to a mapping relationship between the location of the UE in the cell and the downlink path loss or differences between downlink path losses.

Figure 6:
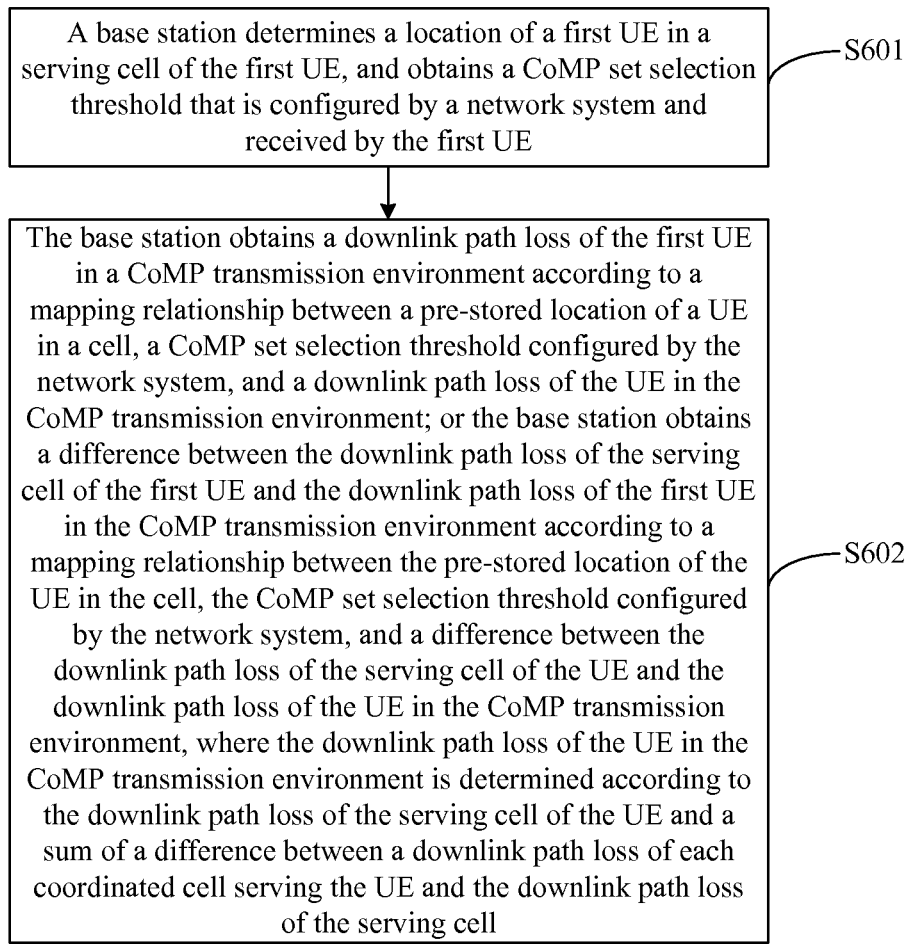
FIG. 6 is a flowchart of a method for obtaining an uplink transmit power control parameter according to an embodiment of the present invention.

Therefore, an embodiment of the present invention provides a method for obtaining an uplink transmit power control parameter. As shown in FIG. 6, the method includes:

S601. A base station determines a location of a first UE in a serving cell serving for the first UE, and obtains a CoMP set selection threshold that is configured by a network system and received by the first UE.

S602. The base station obtains a downlink path loss of the first UE in a CoMP transmission environment according to a mapping relationship between a pre-stored location of a UE in a cell, a CoMP set selection threshold configured by the network system, and a downlink path loss of the UE in the CoMP transmission environment; or the base station obtains a difference between the downlink path loss of the serving cell serving for the first UE and the downlink path loss of the first UE in the CoMP transmission environment according to a mapping relationship between the pre-stored location of the UE in the cell, the CoMP set selection threshold configured by the network system, and a difference between the downlink path loss of the serving cell serving for the UE and the downlink path loss of the UE in the CoMP transmission environment, where the downlink path loss of the UE in the CoMP transmission environment is determined according to the downlink path loss of the serving cell serving for the UE and a sum of a each difference between a downlink path loss of each coordinated cell serving for the UE and the downlink path loss of the serving cell.

Table 1 shows a form of the mapping relationship between the location of the UE in the cell, the CoMP set selection threshold configured by the network system, and the difference between the downlink path loss of the serving cell serving for the UE and the downlink path loss of the UE in the CoMP transmission environment.

TABLE 1

| Location (Location) | CoMP set selection threshold (CoMP Threshold (dB)) | Parameter (Parameter) |
| --- | --- | --- |
| 1 | 0-3 | $\Delta_1$ |
|  | 3-6 | $\Delta_2$ |
| 2 | 0-3 | $\Delta_3$ |
|  | 3-6 | $\Delta_4$ |
| 3 | 0-3 | $\Delta_5$ |
|  | 3-6 | $\Delta_6$ |
| 4 | 0-3 | $\Delta_7$ |
|  | 3-6 | $\Delta_8$ |
| 5 | 0-3 | $\Delta_9$ |
|  | 3-6 | $\Delta_{10}$ |
| 6 | 0-3 | $\Delta_{11}$ |
|  | 3-6 | $\Delta_{12}$ |

In practical applications, the base station may compare a difference between reference signal receive power of another cell and reference signal receive power of the serving cell with a preset CoMP set selection threshold to judge whether the UE is capable of performing CoMP transmission. The CoMP set selection threshold may be an empirical value, for example, 3 dB, 4 dB, and so on, and may be set by those skilled in the art according to actual requirements. The configured CoMP set selection threshold directly affects the UE in selecting coordinated cells, that is, directly affects the number of coordinated cells selected by the UE, and further affects the downlink path loss of the serving cell serving for the UE and the sum of the each difference between the downlink path loss of each coordinated cell serving for the UE and the downlink path loss of the serving cell in the inference of the foregoing formula. After determining that the UE is capable of performing CoMP transmission, the base station determines, by using a location technology, which specific edge area is nearest to the UE. A logical model of a cell may be regarded as a hexagon, and one hexagon has six sides. As shown in Table 1, 1, 2, 3, 4, 5, and 6 indicate six edge areas of the logical model of the cell, that is, the locations of the UE in the cell. A corresponding difference between downlink path losses may be found by searching for the location and the CoMP set selection threshold in Table 1. The differences between downlink path losses of six edge areas of the cell are statistic mean values based on a large quantity of emulation tests. $\Delta_1$, $\Delta_2$, $\Delta_3$, $\Delta_4$, . . . , $\Delta_{11}$, and $\Delta_{12}$ indicate differences between downlink path losses corresponding to different locations and different CoMP set selection thresholds. Optionally, the downlink path loss of the UE in the CoMP transmission environment may also be determined according to a sum of received signal to interference plus noise ratios of each access point serving for the UE, a sum of strength of an interference signal on a signal that the UE sends to an access point of each cell, the number of resource blocks allocated to the UE $M_{PUSCH}(i)$, a sum of a cell-specific power parameter and a user equipment-specific power parameter, and a transmit power control command of the serving cell serving for the UE.

The downlink path loss of the UE in the CoMP transmission environment may be determined in the following manner:

$$PL^* = \frac{1}{\alpha} \cdot \left\{PL_1 - \left[C - \frac{1}{n}(\gamma + \Delta + I)\right]\right\},$$

where, PL* is the downlink path loss of the UE in the CoMP transmission environment, $\alpha(j)$ is a cell-specific parameter, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where, $C=10 \log_{10}(M_{PUSCH}(i))+P^*_{O\_NOMINAL\_PUSCH}(j)+f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is a transmit power control command of the serving cell, i is a subframe number, and j is a control variable. For the method for determining the downlink path loss of the UE in the CoMP transmission environment, reference may be made to the method shown in FIG. 5, and the details are not repeated herein.

If what the base station obtains is the downlink path loss of the first UE in the CoMP transmission environment, the base station may further provide the first UE with the downlink path loss of the first UE in the CoMP transmission environment after the base station obtains the downlink path loss of the first UE in the CoMP transmission environment.

If what the base station obtains is the difference between the downlink path loss of the serving cell and the downlink path loss of the first UE in the CoMP transmission environment, the base station may further provide the first UE with the difference between the downlink path loss of the serving cell serving for the first UE and the downlink path loss of the first UE in the CoMP transmission environment after the base station obtains the difference between the downlink path loss of the serving cell and the downlink path loss of the first UE in the CoMP transmission environment.

Corresponding to the method shown in FIG. 6, an embodiment of the present invention further provides an base station. For a logical structure of the base station, reference may be made to a logical structure shown in FIG. 4. As shown in FIG. 4, the base station includes: a determining unit 401, configured to determine a location of a first UE in a serving cell serving for the first UE; a first obtaining unit 402, configured to obtain a CoMP set selection threshold that is configured by a network system and received by the first UE; and a second obtaining unit 403, configured to obtain a downlink path loss of the first UE in a CoMP transmission environment according to a mapping relationship between a pre-stored location of a UE in a cell, a CoMP set selection threshold configured by the network system, and a downlink path loss of the UE in the CoMP transmission environment, and according to the CoMP set selection threshold that is configured by the network system, received by the first UE and obtained by the first obtaining unit 402, and the location of the first UE in the serving cell serving for the first UE, where the location of the first UE in the serving cell serving for the first UE is determined by the determining unit 401, or the second obtaining unit 403 is configured to obtain a difference between the downlink path loss of the serving cell serving for the first UE and the downlink path loss of the first UE in the CoMP transmission environment according to a mapping relationship between the pre-stored location of the UE in the cell, the CoMP set selection threshold configured by the network system, and a difference between the downlink path loss of the serving cell serving for the UE and the downlink path loss of the UE in the CoMP transmission environment, and according to the CoMP set selection threshold that is configured by the network system, received by the first UE and obtained by the first obtaining unit 402, and the location of the first UE in the serving cell serving for the first UE, where the location of the first UE in the serving cell serving for the first UE is determined by the determining unit 401, where the downlink path loss of the UE in the CoMP transmission environment is determined according to the downlink path loss of the serving cell serving for the UE and a sum of a each difference between a downlink path loss of each coordinated cell serving for the UE and the downlink path loss of the serving cell.

Optionally, the downlink path loss of the UE in the CoMP transmission environment may also be determined according to a sum of a reception signal to interference plus noise ratios of all access points serving for the UE, a sum of strength of an interference signal on a signal that the UE sends to an access point of each cell, $M_{PUSCH}(i)$ a sum of a cell-specific power parameter and a user equipment-specific power parameter, and a transmit power control command of the serving cell serving for the UE.

The downlink path loss of the UE in the CoMP transmission environment may be determined in the following manner:

$$PL^* = \frac{1}{\alpha} \cdot \left\{PL_1 - \left[C - \frac{1}{n}(\gamma + \Delta + I)\right]\right\},$$

where, PL* is the downlink path loss of the UE in the CoMP transmission environment, $\alpha(j)$ is a cell-specific parameter, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of an interference signal on a signal that the UE sends to an access point of each cell, where, $C=10 \log_{10}(M_{PUSCH}(i))+P^*_{O\_NOMINAL\_PUSCH}(j)+f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is a subframe number, and j is a control variable.

The base station may further include a providing unit 404 configured to provide the first UE with the downlink path loss of the first UE in the CoMP transmission environment after the second obtaining unit 403 obtains the downlink path loss of the first UE in the CoMP transmission environment, or the providing unit 404 is configured to provide the first UE with the difference between the downlink path loss of the serving cell serving for the first UE and the downlink path loss of the first UE in the CoMP transmission environment after the second obtaining unit 403 obtains the difference between the downlink path loss of the serving cell serving for the first UE and the downlink path loss of the first UE in the CoMP transmission environment.

For specific descriptions of the functions of each unit in the base station, reference may be made to related descriptions of the method embodiment shown in FIG. 6, and the details are not repeated herein.

Figure 7:
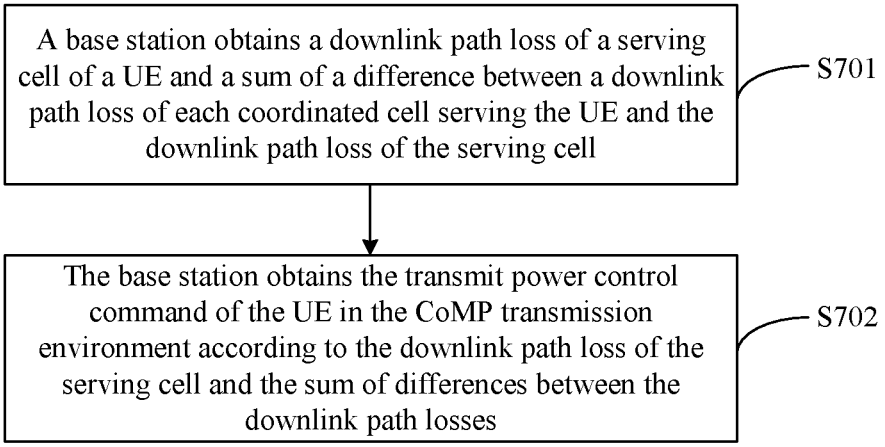
FIG. 7 is a flowchart of a method for obtaining an uplink transmit power control parameter according to an embodiment of the present invention.

The following describes how to determine a transmit power control command of a UE in a CoMP transmission environment according to an embodiment of the present invention. As shown in FIG. 7, a method for obtaining an uplink transmit power control parameter according to an embodiment of the present invention includes:

S701. A base station obtains a downlink path loss of a serving cell serving for a UE and a sum of a each difference between a downlink path loss of each coordinated cell serving for the UE and the downlink path loss of the serving cell.

The purpose of obtaining the downlink path loss of the serving cell and the sum of the each differences between the downlink path loss of each coordinated cell and the downlink path loss of the serving cell by the base station is to calculate the transmit power control command of the UE in the CoMP transmission environment. However, to ensure that the finally obtained transmit power control command of the UE in the CoMP transmission environment is more accurate and practical, in addition to obtaining the transmit power control command of the UE in the CoMP transmission environment according to the downlink path loss of the serving cell and the sum of the each difference between the downlink path loss of each coordinated cell and the downlink path loss of the serving cell, the base station may obtain the transmit power control command of the UE in the CoMP transmission environment according to a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a downlink path loss of the UE in a CoMP transmission environment. Therefore, in addition to obtaining the downlink path loss of the serving cell and the sum of the each difference between the downlink path loss of each coordinated cell and the downlink path loss of the serving cell, the base station may further obtain the sum of the reception signal to interference plus noise ratios of all access points serving for the UE, the sum of strength of the interference signal on the signal that the UE sends to the access point of each cell, the number of resource blocks allocated to the UE, the sum of a cell-specific power parameters and a user equipment-specific power parameter, and the downlink path loss of the UE in the CoMP transmission environment.

S702. The base station obtains the transmit power control command of the UE in the CoMP transmission environment according to the downlink path loss of the serving cell and the sum of differences between downlink path losses.

In practical applications, the base station may obtain the transmit power control command of the UE in the CoMP transmission environment in the following manner:

$$f(i)^* = PL_1 + \frac{1}{n}[\gamma + \Delta + I] - C, \quad \text{formula (2)}$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of an interference signal on a signal that the UE sends to the access points of each cell, where $C=10 \log_{10}(M_{PUSCH}(i))+P^*_{O\_PUSCH}(j)+\alpha(j) \cdot PL^*$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, α(j) is a cell-specific parameter, PL* is the downlink path loss of the UE in the CoMP transmission environment, i is a subframe number, and j is a control variable.

The following describes how to obtain formula (2) in the embodiment of the present invention with a example in which three cells serve for one UE concurrently.

The following equations may be obtained in the CoMP transmission environment:

$$\begin{cases} \gamma_1 = P - PL_1 - I_1 \\ \gamma_2 = P - PL_2 - I_2 \\ \gamma_3 = P - PL_3 - I_3 \\ \gamma = \gamma_1 + \gamma_2 + \gamma_3 \end{cases}$$

where, $PL_1$ is the downlink path loss of the serving cell, $PL_2$ is a downlink path loss of a coordinated cell 1, $PL_3$ is a downlink path loss of a coordinated cell 2, $I_1$ is the strength of an interference signal on a signal that the UE sends to the access point of the serving cell, $I_2$ is the strength of an interference signal on a signal that the UE sends to the access point of the coordinated cell 1, $I_3$ is the strength of an interference signal on a signal that the UE sends to the access point of the coordinated cell 2, γ is the sum of the reception signal to interference plus noise ratios of all access points serving for the UE and the combining manner of γ is maximum ratio combining, and P is uplink signal transmit power of the UE in the CoMP transmission environment. Because the influence of noise is small, it can be ignored here.

The following may be obtained through the foregoing equations:

$$\gamma = P - PL_1 - I_1 + P - PL_2 - I_2 + P - PL_3 - I_3$$
$$= 3P - (PL_1 + PL_2 + PL_3) - (I_1 + I_2 + I_3)$$

$$P = \frac{1}{3}[\gamma + (PL_1 + PL_2 + PL_3) + (I_1 + I_2 + I_3)]$$
$$= \frac{1}{3}[\gamma + PL_1 + (PL_1 + \Delta_1) + (PL_1 + \Delta_2) + (I_1 + I_2 + I_3)]$$
$$= \frac{1}{3}[\gamma + 3PL_1 + \Delta_1 + \Delta_2 + (I_1 + I_2 + I_3)]$$
$$= PL_1 + \frac{1}{3}[\gamma + \Delta_1 + \Delta_2 + (I_1 + I_2 + I_3)]$$

where, $\Delta_1 = PL_2 - PL_1$, and $\Delta_2 = PL_3 - PL_1$,

A formula of the uplink signal transmit power of the UE, where formula is defined in TS 36.213, is:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}$$

$C = 10 \log_{10}(M_{PUSCH}(i)) + P^*_{O\_PUSCH}(j) + \alpha(j) \cdot PL^* + \Delta_{TF}(i)$ is defined, where $\Delta_{TF}(i)$ can be ignored due to an adaptive modulation and coding (AMC) technology, and $P^*_{O\_PUSCH}(j) = P^*_{O\_NOMINAL\_PUSCH}(j) + P_{O\_UE\_PUSCH}(i)$, where the cell-specific power parameter $P^*_{O\_NOMINAL\_PUSCH}(j)$ is the smallest value among $P_{O\_NOMINAL\_PUSCH}(i)$ of all cells in a CoMP set, $P_{O\_UE\_PUSCH}(j)$ is set to 0, and $PL^*$ is the downlink path loss of the UE in the CoMP transmission environment.

The following may be obtained through the foregoing content: $P = C + f(i)^*$.

Finally, the following may be obtained:

$$f(i)^* = PL_1 + \frac{1}{3}[\gamma + \Delta_1 + \Delta_2 + (I_1 + I_2 + I_3)] - C$$
$$= PL_1 + \frac{1}{3}[\gamma + \Delta_1 + \Delta_2 + I] - C$$

where, $I = I_1 + I_2 + I_3$.

If a difference between a transmit power control command of the serving cell and the transmit power control command of the UE in the CoMP transmission environment needs to be obtained, the following may be obtained: $\delta = f(i)_1 - f(i)^*$, where $\delta$ is the difference between the transmit power control command of the serving cell and the transmit power control command of the UE in the CoMP transmission environment, and $f(i)_1$ is the transmit power control command of the serving cell.

The base station may obtain the downlink path loss of the UE in the CoMP transmission environment according to the downlink path loss of the serving cell and the sum of the each difference between the downlink path loss of each coordinated cell and the downlink path loss of the serving cell.

In addition, the base station may further obtain the transmit power control command of the serving cell in addition to all the foregoing parameter values.

The base station may obtain the downlink path loss of the UE in the CoMP transmission environment in the following manner:

$$PL^* = \frac{1}{\alpha} \cdot \left\{ PL_1 - \left[ C - \frac{1}{n}(\gamma + \Delta + I) \right] \right\},$$

where, $PL^*$ is the downlink path loss of the UE in the CoMP transmission environment, $\alpha(j)$ is the cell-specific parameter, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where, $C = 10 \log_{10}(M_{PUSCH}(i)) + P^*_{O\_NOMINAL\_PUSCH}(j) + f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, f(i) is the transmit power control command of the serving cell, i is the subframe number, and j is the control variable.

After the base station obtains the transmit power control command of the UE in the CoMP transmission environment, the base station may further provide the UE with the transmit power control command of the UE in the CoMP transmission environment. In this way, the UE obtains the transmit power control command in the CoMP transmission environment.

After the base station obtains the transmit power control command of the UE in the CoMP transmission environment, the base station may further obtain the difference between the transmit power control command of the serving cell serving for the UE and the transmit power control command of the UE in the CoMP transmission environment. Then, the base station provides the UE with the difference between the transmit power control command of the serving cell and the transmit power control command of the UE in the CoMP transmission environment. After the UE obtains the difference between the transmit power control command of the serving cell and the transmit power control command of the UE in the CoMP transmission environment, the UE may obtain the transmit power control command in the CoMP transmission environment because the UE is capable of obtaining the transmit power control command of the serving cell.

Corresponding to the method shown in FIG. 7, an embodiment of the present invention also provides an base station. For a logical structure of the base station, reference may be made to a base station shown in FIG. 2. The base station includes: a first obtaining unit 201, configured to obtain a downlink path loss of a serving cell serving for a UE and a sum of a each difference between a downlink path loss of each coordinated cell serving for the UE and the downlink path loss of the serving cell; and a second obtaining unit 202, configured to obtain a transmit power control command of the UE in a CoMP transmission environment according to the downlink path loss of the serving cell and the sum of differences between downlink path losses, where the downlink path loss of the serving cell and the sum of differences between downlink path losses are obtained by the first obtaining unit 201.

Optionally, the first obtaining unit 201 may also obtain a sum of a reception signal to interference plus noise ratios of all access points serving for the UE, a sum of strength of an interference signal on a signal that the UE sends to an access point of each cell, $M_{PUSCH}(i)$, a sum of a cell-specific power parameters and a user equipment-specific power parameter, and a downlink path loss of the UE in the CoMP transmission environment.

The second obtaining unit 202 may obtain the transmit power control command of the UE in the CoMP transmission environment in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where C=10 $\log_{10}$ ($M_{PUSCH}$(i))+$P^*_{O\_PUSCH}$(j)+α(j)·PL*, where $M_{PUSCH}$(i) is the number of resource blocks allocated to the UE, $P^*_{O\_NOMINAL\_PUSCH}$(j) is a cell-specific power parameter the value of which is the smallest among the cell-specific power parameters of all cells serving for the UE, α(j) is a cell-specific parameter, PL* is the downlink path loss of the UE in the CoMP transmission environment, i is a subframe number, and j is a control variable.

The first obtaining unit 201 may be configured to obtain the downlink path loss of the UE in the CoMP transmission environment according to the downlink path loss of the serving cell and the sum of differences between the downlink path losses.

The first obtaining unit 201 may further obtain the transmit power control command of the serving cell serving for the UE.

The first obtaining unit 201 may obtain the downlink path loss of the UE in the CoMP transmission environment in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss of the UE in the CoMP transmission environment, α(j) is the cell-specific parameter, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where, C=10 $\log_{10}$($M_{PUSCH}$(i))+$P^*_{O\_NOMINAL\_PUSCH}$(j)+f(i), where $M_{PUSCH}$(i) is the number of resource blocks allocated to the UE, $P^*_{O\_NOMINAL\_PUSCH}$(j) is a cell-specific power parameter the value of which is the smallest among the cell-specific power parameters of all cells serving for the UE, f(i) is the transmit power control command of the serving cell, i is the subframe number, and j is the control variable.

Optionally, the base station may further include a providing unit 204 configured to provide the UE with the transmit power control command of the UE in the CoMP transmission environment after the second obtaining unit 202 obtains the transmit power control command of the UE in the CoMP transmission environment.

Optionally, the base station may further include a third obtaining unit 203 configured to obtain a difference between the transmit power control command of the serving cell serving for the UE and the transmit power control command of the UE in the CoMP transmission environment after the second obtaining unit 202 obtains the transmit power control command of the UE in the CoMP transmission environment. In this case, the providing unit 204 may be configured to provide the UE with the difference between the transmit power control command of the serving cell and the transmit power control command of the UE in the CoMP transmission environment.

For specific descriptions of the functions of each unit in the base station, reference may be made to related descriptions of the method embodiment shown in FIG. 7, and the details are not repeated herein.

In the method embodiment shown in FIG. 7 and the corresponding base station embodiment, the base station may determine, in real time, the transmit power control command or the difference between transmit power control commands. For example, when a UE needs to determine uplink signal transmit power, the base station determines the transmit power control command or the difference between transmit power control commands for the UE. In practical applications, the transmit power control command or the difference between transmit power control commands, which is corresponding to a location of the UE in a cell, may also be obtained in advance. When a UE needs to determine uplink signal transmit power, the base station may determine a current location of the UE in the cell, and then obtain a transmit power control command or a difference between transmit power control commands according to a mapping relationship between the location of the UE in the cell and the transmit power control command or the difference between transmit power control commands.

Figure 8:
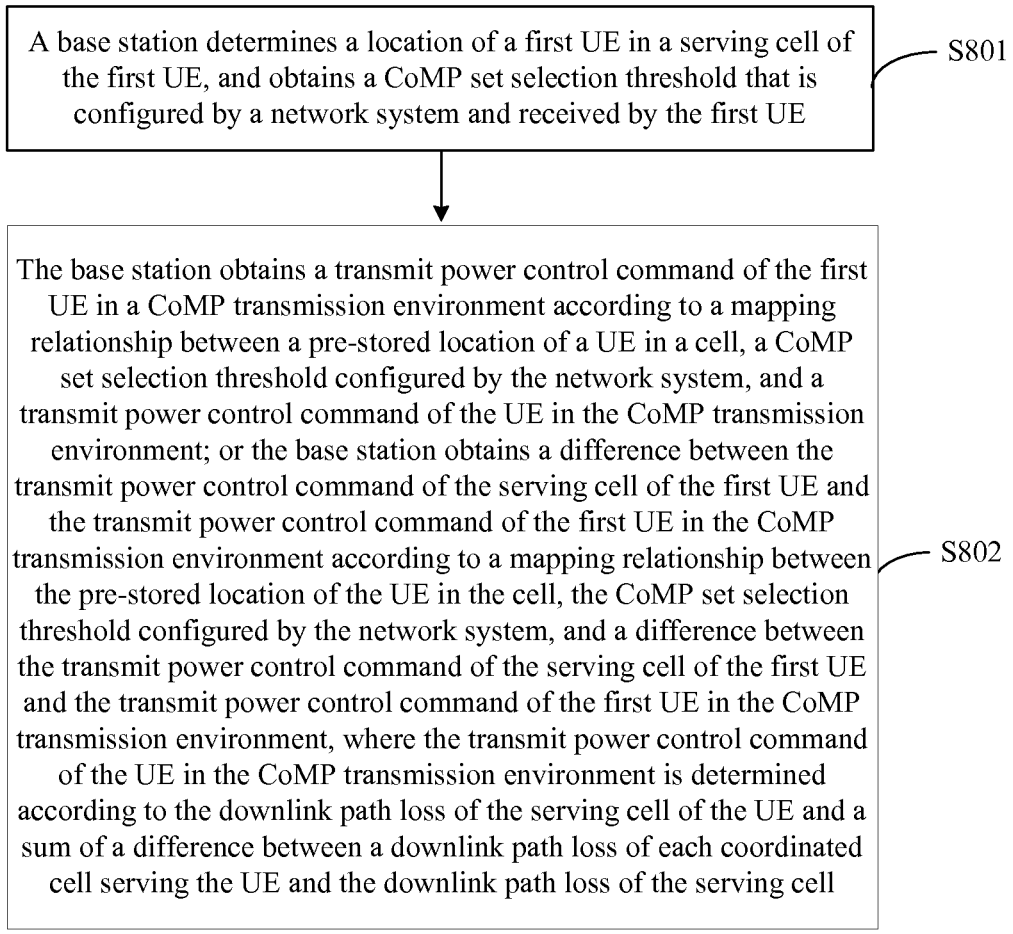
FIG. 8 is a flowchart of a method for obtaining an uplink transmit power control parameter according to an embodiment of the present invention.

Therefore, an embodiment of the present invention provides a method for obtaining an uplink transmit power control parameter. As shown in FIG. 8, the method includes:

S801. A base station determines a location of a first UE in a serving cell serving for the first UE, and obtains a CoMP set selection threshold that is configured by a network system and received by the first UE.

S802. The base station obtains a transmit power control command of the first UE in a CoMP transmission environment according to a mapping relationship between a pre-stored location of a UE in a cell, a CoMP set selection threshold configured by the network system, and a transmit power control command of the UE in the CoMP transmission environment; or the base station obtains a difference between the transmit power control command of the serving cell serving for the first UE and the transmit power control command of the first UE in the CoMP transmission environment according to a mapping relationship between the pre-stored location of the UE in the cell, the CoMP set selection threshold configured by the network system, and a difference between the transmit power control command of the serving cell serving for the first UE and the transmit power control command of the first UE in the CoMP transmission environment, where the transmit power control command of the UE in the CoMP transmission environment is determined according to the downlink path loss of the serving cell serving for the UE and a sum of a each difference between a downlink path loss of each coordinated cell serving for the UE and the downlink path loss of the serving cell.

Table 2 is a form of the mapping relationship between the location of the UE in the cell, the CoMP set selection threshold configured by the network system, and the difference between the transmit power control command of the serving cell serving for the UE and the transmit power control command of the UE in the CoMP transmission environment.

TABLE 2

| Location (Location) | CoMP set selection threshold (CoMP Threshold (dB)) | Parameter (Parameter) |
| --- | --- | --- |
| 1 | 0-3 | $\delta_1$ |
|   | 3-6 | $\delta_2$ |
| 2 | 0-3 | $\delta_3$ |
|   | 3-6 | $\delta_4$ |
| 3 | 0-3 | $\delta_5$ |
|   | 3-6 | $\delta_6$ |
| 4 | 0-3 | $\delta_7$ |
|   | 3-6 | $\delta_8$ |
| 5 | 0-3 | $\delta_9$ |
|   | 3-6 | $\delta_{10}$ |
| 6 | 0-3 | $\delta_{11}$ |
|   | 3-6 | $\delta_{12}$ |

As shown in Table 2, 1, 2, 3, 4, 5, and 6 indicate six edge areas of a logical model of a cell, that is, locations of the UE in the cell. $\delta_1, \delta_2, \delta_3, \delta_4 \ldots \delta_{11}$, and $\delta_{12}$ indicate differences between power control commands corresponding to different locations and different CoMP set selection thresholds.

Optionally, the transmit power control command of the UE in the CoMP transmission environment is also determined according to a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and a downlink path loss of the UE in the CoMP transmission environment.

The transmit power control command of the UE in the CoMP transmission environment may be determined in the following manner:

$$f(i)^* = PL_1 + \frac{1}{n}[\gamma + \Delta + I] - C,$$

where, f(i)* is the transmit power control command of the UE in the CoMP transmission environment, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where C=10 $\log_{10}$ ($M_{PUSCH}$(i))+$P^*_{O\_PUSCH}$(j)+α(j)·PL*, where $M_{PUSCH}$(i) is the number of resource blocks allocated to the UE, $P^*_{O\_NOMINAL\_PUSCH}$(j) is a cell-specific power parameter the value of which is the smallest among the cell-specific power parameters of all cells serving for the UE, α(j) is a cell-specific parameter, PL* is the downlink path loss of the UE in the CoMP transmission environment, i is a subframe number, and j is a control variable.

The downlink path loss of the UE in the CoMP transmission environment may be determined according to the downlink path loss of the serving cell and the sum of the each difference between the downlink path loss of each coordinated cell serving for the UE and the downlink path loss of the serving cell.

The downlink path loss of the UE in the CoMP transmission environment may be determined in the following manner:

$$PL^* = \frac{1}{\alpha} \cdot \left\{ PL_1 - \left[ C - \frac{1}{n}(\gamma + \Delta + I) \right] \right\},$$

where, PL* is the downlink path loss of the UE in the CoMP transmission environment, α(j) is the cell-specific parameter, $PL_1$ is the downlink path loss of the serving cell, n is the number of cells serving for the UE, γ is the sum of the reception signal to interference plus noise ratios of all access points serving for the UE, Δ is the sum of the each difference between the downlink path loss of each coordinated cell serving for the UE and the downlink path loss of the serving cell, and I is the sum of strength of the interference signal on the signal that the UE sends to the access point of each cell, where, C=10 $\log_{10}$($M_{PUSCH}$(i))+$P^*_{O\_NOMINAL\_PUSCH}$(j)+f (i), where $M_{PUSCH}$(i) is the number of resource blocks allocated to the UE, $P^*_{O\_NOMINAL\_PUSCH}$(j) is a cell-specific power parameter the value of which is the smallest among the cell-specific power parameters of all cells serving for the UE, f(i) is the transmit power control command of the serving cell, i is the subframe number, and j is the control variable.

If what the base station obtains is the transmit power control command of the first UE in the CoMP transmission environment, the base station may further provide the first UE with the transmit power control command of the first UE in the CoMP transmission environment after the base station obtains the transmit power control command of the first UE in the CoMP transmission environment.

If what the base station obtains is the difference between the transmit power control command of the serving cell serving for the first UE and the transmit power control command of the first UE in the CoMP transmission environment, the base station may further provide the first UE with the difference between the transmit power control command of the serving cell serving for the first UE and the transmit power control command of the first UE in the CoMP transmission environment after the base station obtains the difference between the transmit power control command of the serving cell serving for the first UE and the transmit power control command of the first UE in the CoMP transmission environment.

Corresponding to the method shown in FIG. 8, an embodiment of the present invention also provides an base station. For a logical structure of the base station, reference may be made to a base station shown in FIG. 4. The base station includes: a determining unit 401, configured to determine a location of a first UE in a serving cell serving for the first UE; a first obtaining unit 402, configured to obtain a CoMP set selection threshold that is configured by a network system and received by the first UE; and a second obtaining unit 403, configured to obtain a transmit power control command of the first UE in a CoMP transmission environment according to a mapping relationship between a pre-stored location of a UE in a cell, a CoMP set selection threshold configured by the network system, and a transmit power control command of the UE in the CoMP transmission environment, and according to the CoMP set selection threshold that is configured by the network system, received by the first UE and obtained by the first obtaining unit 402, and the location of the first UE in the serving cell serving for the first UE, where the location of the first UE in the serving cell serving for the first UE is determined by the determining unit 401, or the second obtaining unit 403 is configured to obtain a difference between the transmit power control command of the serving cell serving for the first UE and the transmit power control command of the first UE in the CoMP transmission environment according to a mapping relationship between the pre-stored location of the UE in the cell, the CoMP set selection threshold configured by the network system, and a difference between the transmit power control command of the serving cell serving for the UE and the transmit power control command of the UE in the CoMP transmission environment, and according to the CoMP set selection threshold that is configured by the network system received by the first UE, and obtained by the first obtaining unit 402, and the location of the first UE in the serving cell serving for the first UE, where the location of the first UE in the serving cell serving for the first UE determined by the determining unit 401, where the transmit power control command of the UE in the CoMP transmission environment is determined according to the downlink path loss of the serving cell serving for the UE and a sum of a each difference between downlink path loss of each coordinated cell serving for the UE and the downlink path loss of the serving cell.

The transmit power control command of the UE in the CoMP transmission environment may also be determined according to a sum of a reception signal to interference plus noise ratios of all access points serving for the UE, a sum of strength of an interference signal on a signal that the UE sends to an access point of each cell, the number of resource blocks allocated to the UE, a sum of a cell-specific power parameter and a user equipment-specific power parameter, and the downlink path loss of the UE in the CoMP transmission environment.

The transmit power control command of the UE in the CoMP transmission environment may be determined in the following manner:

$$f(i)^* = PL_1 + \frac{1}{n}[\gamma + \Delta + I] - C,$$

where, $f(i)^*$ is the transmit power control command of the UE in the CoMP transmission environment, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where $C=10 \log_{10}(M_{PUSCH}(i))+P^*_{O\_PUSCH}(j)+\alpha(j) \cdot PL^*$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, $\alpha(j)$ is a cell-specific parameter, $PL^*$ is the downlink path loss of the UE in the CoMP transmission environment, i is a subframe number, and j is a control variable.

The downlink path loss of the UE in the CoMP transmission environment may be determined according to the downlink path loss of the serving cell and the sum of the each difference between the downlink path loss of each coordinated cell serving for the UE and the downlink path loss of the serving cell.

The downlink path loss of the UE in the CoMP transmission environment may be determined in the following manner:

$$PL^* = \frac{1}{\alpha} \cdot \left\{ PL_1 - \left[ C - \frac{1}{n}(\gamma + \Delta + I) \right] \right\},$$

where, $PL^*$ is the downlink path loss of the UE in the CoMP transmission environment, $\alpha(j)$ is the cell-specific parameter, $PL_1$ is the downlink path loss of the serving cell, n is the number of cells serving for the UE, $\gamma$ is the sum of the reception signal to interference plus noise ratios of all access points serving for the UE, $\Delta$ is the sum of the each difference between the downlink path loss of each coordinated cell serving for the UE and the downlink path loss of the serving cell, and I is the sum of strength of the interference signal on the signal that the UE sends to the access point of each cell, where, $C=10 \log_{10}(M_{PUSCH}(i))+P^*_{O\_NOMINAL\_PUSCH}(j)+f(i)$, where $M_{PUSCH}(i)$ is the number of resource blocks allocated to the UE, $P^*_{O\_NOMINAL\_PUSCH}(j)$ is a cell-specific power parameter the value of which is the smallest among the cell-specific power parameters of all cells serving for the UE, $f(i)$ is the transmit power control command of the serving cell, i is the subframe number, and j is the control variable.

Optionally, the base station may further include a providing unit 404 configured to provide the first UE with the transmit power control command of the first UE in the CoMP transmission environment after the second obtaining unit 403 obtains the transmit power control command of the first UE in the CoMP transmission environment, or to provide the first UE with the difference between the transmit power control command of the serving cell serving for the first UE and the transmit power control command of the first UE in the CoMP transmission environment after the second obtaining unit 403 obtains the difference between the transmit power control command of the serving cell serving for the first UE and the transmit power control command of the first UE in the CoMP transmission environment.

For specific descriptions of the functions of each unit in the base station, reference may be made to related descriptions of the method embodiment shown in FIG. 8, and the details are not repeated herein.

Figure 9:
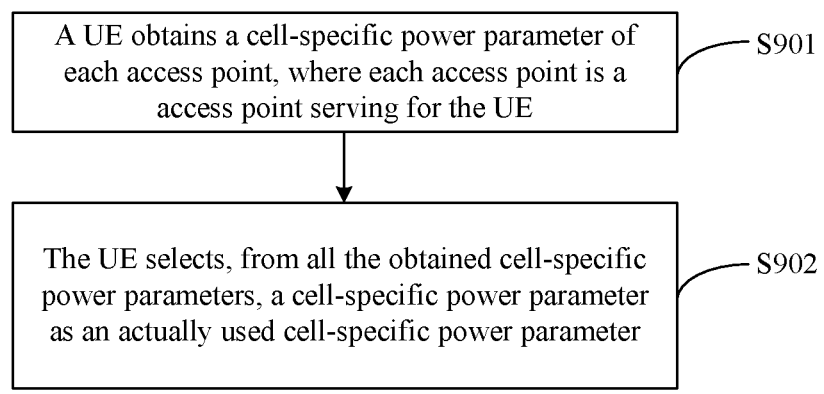
FIG. 9 is a flowchart of a method for obtaining an uplink transmit power control parameter according to an embodiment of the present invention.

The following describes how to determine an actually used cell-specific power parameter according to an embodiment of the present invention. As shown in FIG. 9, a method for obtaining an uplink transmit power control parameter according to an embodiment of the present invention includes:

S901. A UE obtains a cell-specific power parameter provided by each access point, where each access point is an access point serving for the UE.

The cell-specific power parameter is broadcasted by an base station. Therefore, the UE can obtain the cell-specific power parameter of each cell, or the UE can obtain the cell-specific power parameter of each access point.

S902. The UE selects, from all the obtained cell-specific power parameters, a cell-specific power parameter as an actually used cell-specific power parameter.

The UE may randomly select, from all the cell-specific power parameters, a cell-specific power parameter as the actually used cell-specific power parameter, or may select, according to a certain rule, a cell-specific power parameter as the actually used cell-specific power parameter. For example, the UE selects, from all the cell-specific power parameters, a cell-specific power parameter the value of which is the smallest, as the actually used cell-specific power parameter.

The UE may further provide the base station serving for the UE with the actually used cell-specific power parameter, after the UE selects, from all the cell-specific power parameters, the cell-specific power parameter the value of which is the smallest, as the actually used cell-specific power parameter. In this way, the base station may use the cell-specific power parameter provided by the UE, to calculate a difference between downlink path losses, or to calculate the transmit power control command of the UE in the CoMP transmission environment, or for other processing.

Figure 10:
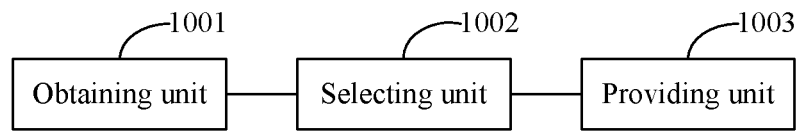
FIG. 10 is a schematic diagram of a logical structure of a UE according to an embodiment of the present invention.

Corresponding to the method shown in FIG. 9, an embodiment of the present invention further provides a UE. As shown in FIG. 10, the UE includes: an obtaining unit 1001, configured to obtain a cell-specific power parameter provided by each access point, where each access point is an access point serving for the UE shown in FIG. 10; and a selecting unit 1002, configured to select, from all the cell-specific power parameters obtained by the obtaining unit 1001, a cell-specific power parameter as an actually used cell-specific power parameter.

The obtaining unit 1001 may be configured to select, from all the obtained cell-specific power parameters, a cell-specific power parameter the value of which is the smallest, as the actually used cell-specific power parameter.

The UE may further include a providing unit 1003 configured to provide a base station serving for the UE shown in FIG. 10 with the actually used cell-specific power parameter after the obtaining unit 1001 selects, from all the obtained cell-specific power parameters, the cell-specific power parameter as the actually used cell-specific power parameter.

For specific descriptions of the functions of each unit in the UE, reference may be made to related descriptions of the method provided in the embodiment shown in FIG. 9, and the details are not repeated herein.

In conclusion, in the embodiments of the present invention, the factor of the CoMP transmission scenario is fully considered in a process of obtaining uplink transmit power control parameters, and the problem about how to determine uplink transmit power control parameters in the CoMP transmission scenario is solved. Thereby, the reduction of cell throughput and waste of UE power consumption are avoided.

Persons of ordinary skill in the art can understand that all or some of the steps in the foregoing method embodiments may be implemented by a program instructing related hardware. The program may be stored in a computer readable storage medium. When the program is executed, the processes of the foregoing method embodiments are executed. The storage medium may be a magnetic disk, a CD-ROM, a read-only memory (Read-Only Memory, ROM) or a random access memory (Random Access Memory, RAM), etc.

The foregoing descriptions are merely exemplary embodiments of the present invention. It should be noted that that persons of ordinary skill in the art may make various improvements and refinements without departing from the principle of the invention. Such improvements and refinements shall fall within the protection scope of the present invention.

What is claimed is:

1. A method for obtaining an uplink transmit power control parameter, wherein the method is applicable to a radio communication system using a coordinated multi-point transmission technology, and comprises:
   obtaining, by a base station, a downlink path loss of a serving cell of a user equipment, and obtaining a sum of each difference between a downlink path loss of each coordinated cell serving for the user equipment and the downlink path loss of the serving cell;
   obtaining, by the base station, a sum of a reception signal to interference plus noise ratios of all access points serving for the user equipment, a sum of strength of an interference signal on a signal that the user equipment sends to an access point of each cell, the number of resource blocks allocated to the user equipment, a sum of a cell-specific power parameter and a user equipment-specific power parameter, and a transmit power control command of the serving cell of the user equipment; and
   obtaining, by the base station, a downlink path loss of the user equipment in a coordinated multi-point transmission environment and a transmit power control command of the user equipment in the coordinated multi-point transmission environment according to the downlink path loss of the serving cell and the sum of differences between the downlink path losses, the base station obtaining the downlink path loss of the user equipment in the coordinated multi-point transmission environment in the following manner:

$$PL^* = \frac{1}{\alpha(j)} \cdot \left\{ PL_1 - \left[ C - \frac{1}{n}(\gamma + \Delta + I) \right] \right\},$$

wherein, PL* is the downlink path loss of the user equipment in the coordinated multi-point transmission environment, $\alpha(j)$ is a cell-specific parameter, $PL_1$ is the downlink path loss of the serving cell, n is the number of cells serving for the user equipment, $\gamma$ is the sum of the reception signal to interference plus noise ratio of all access points serving for the user equipment, $\Delta$ is the sum of the each difference between the downlink path loss of each coordinated cell serving for the user equipment and the downlink path loss of the serving cell, and I is the sum of strength of an interference signal on a signal that the user equipment sends to the access point of each cell,
wherein, $C = 10 \log_{10}(M_{PUSCH}(i)) + P^*_{O\_NOMINAL\_PUSCH}(j) + f(i)$, wherein
$M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, $f(i)$ is the transmit power control command, i is a subframe number, and j is a control variable.

2. The method according to claim 1, wherein after the base station obtains the downlink path loss of the user equipment in the coordinated multi-point transmission environment, the method further comprises:
   obtaining, by the base station, a difference between the downlink path loss of the serving cell and the downlink path loss of the user equipment in the coordinated multi-point transmission environment; and
   providing, by the base station, the user equipment with the difference between the downlink path loss of the serving cell and the downlink path loss of the user equipment in the coordinated multi-point transmission environment.

3. The method according to claim 1, wherein after the base station obtains the transmit power control command of the user equipment in the coordinated multi-point transmission environment, the method further comprises:
   obtaining, by the base station, a difference between a transmit power control command of the serving cell serving for the user equipment and the transmit power control command of the user equipment in the coordinated multi-point transmission environment; and
   providing, by the base station, the user equipment with the difference between the transmit power control command of the serving cell serving for the user equipment and the transmit power control command of the user equipment in the coordinated multi-point transmission environment.

4. The method according to claim 1, further comprising:
setting a one-to-one mapping relationship between a location of the user equipment in the serving cell, a CoMP set selection threshold that is configured by a network system and received by the user equipment, and the downlink path loss of the user equipment in the coordinated multi-point transmission environment; or setting a one-to-one mapping relationship between the location of the user equipment in the serving cell, the CoMP set selection threshold that is configured by the network system and received by the user equipment, and the transmit power control command of the user equipment in the coordinated multi-point transmission environment.

5. A non-transitory computer program product encoded with executable instructions, which, when executed by a computer unit, will cause the computer unit to perform the steps of the base station according to claim 1.

6. A method for obtaining an uplink transmit power control parameter, wherein the method is applicable to a radio communication system using a coordinated multi-point transmission technology, and comprises:

obtaining, by an base station, a downlink path loss of a serving cell of a user equipment, and obtaining a sum of a each difference between a downlink path loss of each coordinated cell serving for the user equipment and the downlink path loss of the serving cell; and obtaining, by the base station, a downlink path loss of the user equipment in a coordinated multi-point transmission environment and a transmit power control command of the user equipment in the coordinated multi-point transmission environment according to the downlink path loss of the serving cell and the sum of differences between the downlink path losses, wherein the base station further obtains a sum of a reception signal to interference plus noise ratio of each access point serving for the user equipment, a sum of strength of an interference signal on a signal that the user equipment sends to an access point of each cell, the number of resource blocks allocated to the user equipment, and a sum of a cell-specific power parameter and a user equipment-specific power parameter; and the base station further obtains the transmit power control command of the user equipment in the coordinated multi-point transmission environment in the following manner:

$$f(i)^* = PL_1 + \frac{1}{n}[\gamma + \delta + I] - C,$$

wherein, f(i)* is the transmit power control command of the user equipment in the coordinated multi-point transmission environment, $PL_1$ is the downlink path loss of the serving cell, n is the number of cells serving for the user equipment, γ is the sum of the reception signal to interference plus noise ratio of all access points serving for the user equipment, δ is the sum of the each difference between the downlink path loss of each coordinated cell serving for the user equipment and the downlink path loss of the serving cell, and I is the sum of strength of an interference signal on a signal that the user equipment sends to the access point of each cell, wherein C = $10\log_{10}(M_{PUSCH}(i)) + P^*_{O\_PUSCH}(j) + \alpha(j) \cdot PL^*$, wherein $M_{PUSCH}(i)$ is the number of resource blocks allocated to the user equipment, $P^*_{O\_NOMINAL\_PUSCH}$ α(j) is a cell-specific power parameter the value of which is the smallest among cell-specific power parameters of all cells serving the user equipment, α(j) is a cell-specific parameter, PL* is the downlink path loss of the user equipment in the coordinated multi-point transmission environment, i is a subframe number, and j is a control variable.

7. A base station, wherein the base station is applicable to a radio communication system using a coordinated multi-point technology and comprises:

a first obtaining unit, configured to obtain a downlink path loss of a serving cell of a user equipment, obtain a sum of each difference between a downlink path loss of each coordinated cell serving for the user equipment and the downlink path loss of the serving cell, and obtain a sum of a reception signal to interference plus noise ratio of all access points serving for the user equipment, a sum of strength of an interference signal on a signal that the user equipment sends to an access point of each cell, the number of resource blocks allocated to the user equipment, a sum of a cell-specific power parameter and a user equipment-specific power parameter, and a transmit power control command of the serving cell serving for the user equipment; and a second obtaining unit, configured to obtain a downlink path loss of the user equipment in a coordinated multi-point transmission environment and a transmit power control command of the user equipment in the coordinated multi-point transmission environment according to the downlink path loss of the serving cell and the sum of differences of downlink path losses, wherein the downlink path loss of the serving cell and the sum of differences of downlink path losses are obtained by the first obtaining unit; and the second obtaining unit obtaining the downlink path loss of the user equipment in the coordinated multi-point transmission environment in the following manner:

$$PL^* = \frac{1}{\alpha} \cdot \left\{ PL_1 - \left[ C - \frac{1}{n}(\gamma + \Delta + I) \right] \right\},$$

wherein, PL* is the downlink path loss of the user equipment in the coordinated multi-point transmission environment, Δ(j) is a cell-specific parameter, $PL_1$ is the downlink path loss of the serving cell, n is the number of cells serving for the user equipment, γ is the sum of the reception signal to interference plus noise ratio of all access points serving for the user equipment, Δ is the sum of the each difference between the downlink path loss of each coordinated cell serving for the user equipment and the downlink path loss of the serving cell, and I is the sum of strength of an interference signal on a signal that the user equipment sends to the access point of each cell, wherein, C = $10\log_{10}(M_{PUSCH}(i)) + P^*_{O\_NOMINAL\_PUSCH}(j) + f(i)$, wherein $M_{PUSCH}(i)$ is the number of resource blocks allocated to the equipment, $P^*_{O\_NOMINAL\_PUSCH}(j)$ is a cell-specific power parameter the value of which is the smallest among cell-specific power parameters of all cells serving the user equipment, f(i) is the transmit power control command, i is a subframe number, and j is a control variable.

8. The base station according to claim 7, further comprising:
   a third obtaining unit, configured to obtain a difference between the downlink path loss of the serving cell and the downlink path loss of the user equipment in the coordinated multi-point transmission environment after the second obtaining unit obtains the downlink path loss of the user equipment in the coordinated multi-point transmission environment; and
   a providing unit, configured to provide the user equipment with the difference between the downlink path loss of the serving cell and the downlink path loss of the user equipment in the coordinated multi-point transmission environment, wherein the difference is obtained by the third obtaining unit.

9. The base station according to claim 7, further comprising:
   a unit configured to set a one-to-one mapping relationship between a location of the user equipment in the serving cell, a coordinated multi-points CoMP set selection threshold that is configured by a network system and received by the user equipment, and the downlink path loss of the user equipment in the coordinated multi-points transmission environment; or
   a unit configured to set a one-to-one mapping relationship between the location of the user equipment in the serving cell, the coordinated multi-point CoMP set selection threshold configured by the network system and received by the user equipment ,and the transmit power control command of the user equipment in the coordinated multi-point transmission environment.

10. A base station, wherein the base station is applicable to a radio communication system using a coordinated multi-point technology and comprises:
    a first obtaining unit, configured to obtain a downlink path loss of a serving cell of a user equipment, and obtain a sum of a each difference between a downlink path loss of each coordinated cell serving for the user equipment and the downlink path loss of the serving cell; and
    a second obtaining unit, configured to obtain a downlink path loss of the user equipment in a coordinated multi-point transmission environment and a transmit power control command of the user equipment in the coordinated multi-point transmission environment according to the downlink path loss of the serving cell and the sum of differences of downlink path losses, wherein the downlink path loss of the serving cell and the sum of differences of downlink path losses are obtained by the first obtaining unit, wherein the first obtaining unit is further configured to obtain a sum of a reception signal to interference plus noise ratio of each access point serving for the user equipment, a sum of strength of an interference signal on a signal that the user equipment sends to an access point of each cell, the number of resource blocks allocated to the user equipment, and a sum of a cell-specific power parameter and a user equipment-specific power parameter; and
    the second obtaining unit is further configured to obtain the transmit power control command of the user equipment in the coordinated multi-point transmission environment in the following manner:

$$f(i)^* = PL_1 + \frac{1}{n}[\gamma + \delta + I] - C,$$

wherein, f(i)* is the transmit power control command of the user equipment in the coordinated multi-point transmission environment, $PL_1$ is the downlink path loss of the serving cell, n is the number of cells serving for the user equipment, γ is the sum of the reception signal to interference plus noise ratios of all access points serving for the user equipment, δ is the sum of the each difference between the downlink path loss of each coordinated cell serving for the user equipment and the downlink path loss of the serving cell, and I is the sum of strength of the interference signal on the signal that the user equipment sends to the access point of each cell, wherein $C=10\log_{10}(M_{PUSCH}(i))+P^*_{O\_PUSCH}(j)+\alpha(j)\cdot PL^*$,
wherein $M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, α(j) is a cell-specific parameter, PL* is the downlink path loss of the user equipment in the coordinated multi-point transmission environment, i is a subframe number, and j is a control variable.

11. The base station according to claim 10, further comprising:
    a third obtaining unit, configured to obtain a difference between the transmit power control command of the serving cell of the user equipment and the transmit power command of the user equipment in the coordinated multi-point transmission environment after the second obtaining unit obtains the transmit power control command of the user equipment in the coordinated multi-point transmission environment; and
    a providing unit, configured to provide the user equipment with the difference between the transmit power control command of the serving cell of the user equipment and the transmit power command of the user equipment in the coordinated multi-point transmission environment, wherein the difference is obtained by the third obtaining unit.

12. A method for obtaining an uplink transmit power control parameter, wherein the method is applicable to a radio communication system using a coordinated multi-point transmission technology, and comprises:
    determining, by a base station, a location of a user equipment in a serving cell of the user equipment, and obtaining a coordinated multi-point CoMP set selection threshold that is configured by a network system and received by the user equipment; and
    obtaining, by the base station, uplink transmit power control parameters of the user equipment in a coordinated multi-point transmission environment according to a mapping relationship between a pre-stored location of a user equipment in a cell, a CoMP set selection threshold configured by the network system, and an uplink transmit power control parameter of the user equipment in the coordinated multi-point transmission environment or
    obtaining, by the base station, a difference between an uplink transmit power control parameter of the serving cell serving for the user equipment and the uplink transmit power control parameter of the user equipment in the coordinated multi-point transmission environment according to the determined location, the obtained threshold, and a mapping relationship between the pre-stored location of the user equipment in the cell, the CoMP set selection threshold configured by the network system, and the difference between the uplink transmit power control parameter of the serving cell of the user equipment and the uplink transmit power control parameter of the user equipment in the coordinated multi-point transmission environment;

wherein, the uplink transmit power control parameter of the user equipment in the coordinated multi-point transmission environment is determined according to the uplink transmit power control parameter of the serving cell serving for the user equipment and a sum of each difference between an uplink transmit power control parameter of an coordinated cell of the user equipment and the uplink transmit power control parameter of the serving cell.

13. The method according to claim 12, wherein:
if the uplink transmit power control parameter is a downlink path loss, the obtaining a downlink path loss of the user equipment in the coordinated multi-point transmission environment further comprises:
obtaining the downlink path loss of the user equipment in the coordinated multi-point transmission environment according to a sum of a reception signal to interference plus noise ratio of each access point serving for the user equipment, a sum of strength of an interference signal on a signal that the user equipment sends to an access point of each cell, the number of resource blocks allocated to the user equipment, a sum of a cell-specific power parameter and a user equipment-specific power parameter, and a transmit power control command of the serving cell of the user equipment; and
further obtaining, by the user equipment, the downlink path loss of the user equipment in the coordinated multi-point transmission environment in the following manner:

$$PL^* = \frac{1}{\alpha(j)} \cdot \left\{ PL_1 - \left[ C - \frac{1}{n}(\gamma + \Delta + I) \right] \right\},$$

wherein, PL* is the downlink path loss of the user equipment in the coordinated multi-point transmission environment, $\alpha(j)$ is a cell-specific parameter, $PL_1$ is a downlink path loss of the serving cell, n is the number of cells serving for the user equipment, $\gamma$ is the sum of the reception signal to interference plus noise ratio of each access point serving for the user equipment, $\Delta$ is a sum of a each difference between a downlink path loss of each coordinated cell serving for the user equipment and the downlink path loss of the serving cell, and I is the sum of strength of the interference signal on the signal that the user equipment sends to the access point of each cell, wherein $C=10\log_{10}(M_{PUSCH}(i))+P^*_{O\_NOMINAL\_PUSCH}(j)+f(i)$, wherein $M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, f(i) is the transmit power control command of the serving cell, i is a subframe number, and j is a control variable.

14. The method according to claim 12, wherein:
the uplink transmit power control parameter is a transmit power control command and the obtaining the transmit power control command of the user equipment in the coordinated multi-point transmission environment further comprises:
obtaining the transmit power control command of the user equipment in the coordinated multi-poins transmission environment according to a sum of a reception signal to interference plus noise ratio of each access point serving for the user equipment, a sum of strength of an interference signal on a signal that the user equipment sends to an access point of each cell, the number of resource blocks allocated to the user equipment, a sum of a cell-specific power parameter and a user equipment-specific power parameter, and a downlink path loss of the user equipment in the coordinated multi-point transmission environment; and
further obtaining, by the user equipment, the transmit power control command of the user equipment in the coordinated multi-point transmission environment in the following manner:

$$f(i)^* = PL_1 + \frac{1}{n}[\gamma + \delta + I] - C,$$

wherein, f(i)* is the transmit power control command of the user equipment in the coordinated multi-point transmission environment, $PL_1$ is a downlink path loss of the serving cell, n is the number of cells serving for the user equipment, $\gamma$ is the sum of the reception signal to interference plus noise ratio of each access point serving for the user equipment, $\gamma$ is a sum of each difference between downlink path loss of each coordinated cell serving for the user equipment and the downlink path loss of the serving cell, and I is the sum of strength of the interference signal on the signal that the user equipment sends to the access point of each cell,
wherein $C=10\log_{10}(M_{PUSCH}(i))+P^*_{O\_PUSCH}(j)+\alpha(j)\cdot PL^*$, wherein $M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, $\alpha(j)$ is a cell-specific parameter, PL* is the downlink path loss of the user equipment in the coordinated multi-point transmission environment, i is a subframe number, and j is a control variable.

15. The method according to claim 12, wherein:
after the base station obtains the uplink transmit power control parameter of the user equipment in the coordinated multi-point transmission environment, the method further comprises:
providing, by the base station, the user equipment with the uplink transmit power control parameter of the user equipment in the coordinated multi-point transmission environment; or
after the base station obtains the difference between the uplink transmit power control parameter of the serving cell of the user equipment and the uplink transmit power control parameter of the user equipment in the coordinated multi-point transmission environment, the method further comprises:
providing, by the base station, the user equipment with the difference between the uplink transmit power control parameter of the serving cell of the user equipment and the uplink transmit power control parameter of the user equipment in the coordinated multi-point transmission environment.

16. A base station, wherein the base station is applicable to a radio communication system using a coordinated multi-point technology and comprises:
  a determining unit, configured to determine a location of a user equipment in a serving cell of the user equipment;
  a first obtaining unit, configured to obtain a coordinated multi-point CoMP set selection threshold that is configured by a network system and received by the user equipment; and
  a second obtaining unit, configured to obtain an uplink transmit power control parameter of the user equipment in a coordinated multi-point transmission environment according to a mapping relationship between a pre-stored location of the user equipment in a cell, a CoMP set selection threshold configured by the network system, and the uplink transmit power control parameter of the user equipment in the coordinated multi-point transmission environment, and according to the location determined by the determining unit, and the threshold obtained by the first obtaining unit; or
  obtain a difference between an uplink transmit power control parameter of the serving cell of the user equipment and the uplink transmit power control parameter of the user equipment in the coordinated multi-point transmission environment according to a mapping relationship between the pre-stored location of the user equipment in the cell, the CoMP set selection threshold configured by the network system, and the difference between the uplink transmit power control parameters of the serving cell of the user equipment and the uplink transmit power control parameter of the user equipment in the coordinated multi-point transmission environment, and according to the location determined by the determining unit, and the threshold obtained by the first obtaining unit;
  wherein, the uplink transmit power control parameter of the user equipment in the coordinated multi-point transmission environment is determined according to the uplink transmit power control parameter of the serving cell serving for the user equipment and a sum of each difference between an uplink transmit power control parameter of an coordinated cell of the user equipment and the uplink transmit power control parameter of the serving cell.

17. The base station according to claim 16, wherein:
  if the uplink transmit power control parameter is a downlink path loss, the second obtaining unit is further configured to obtain the downlink path loss of the user equipment in the coordinated multi-point transmission environment according to a sum of the reception signal to interference plus noise ratio of each access point serving for the user equipment, a sum of strength of an interference signal on an signal that the user equipment sends to an access point of each cell, the number of resource blocks allocated to the user equipment, a sum of a cell-specific power parameter and a user equipment-specific power parameter, and a transmit power control command of the serving cell of the user equipment; and
  the second obtaining unit is further configured to obtain the downlink path loss of the user equipment in the coordinated multi-point transmission environment in the following manner:

$$PL^* = \frac{1}{\alpha} \cdot \left\{ PL_1 - \left[ C - \frac{1}{n}(\gamma + \Delta + I) \right] \right\},$$

wherein, PL* is the downlink path loss of the user equipment in the coordinated multi-point transmission environment, α(j) is a cell-specific parameter, $PL_1$ is a downlink path loss of the serving cell, n is the number of cells serving for the user equipment, γ is the sum of the reception signal to interference plus noise ratio of each access point serving for the user equipment, Δ is a sum of each difference between a downlink path loss of each coordinated cell serving for the user equipment and the downlink path loss of the serving cell, and I is the sum of strength of the interference signal on the signal that the user equipment sends to the access point of each cell,
  wherein $C=10\log_{10}(M_{PUSCH}(i))+P^*_{O\_NOMINAL\_PUSCH}(j)+f(i)$, wherein $M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, f(i) is the transmit power control command of the serving cell, i is a subframe number, and j is a control variable.

18. The base station according to claim 16, wherein:
  if the uplink transmit power control parameter is a transmit power control command, the second obtaining unit is further configured to obtain a transmit power control command of the user equipment in the coordinated multi-point transmission environment according to a sum of a reception signal to interference plus noise ratio of each access point serving for the user equipment, a sum of strength of an interference signal on a signal that the user equipment sends to an access point of each cell, the number of resource blocks allocated to the user equipment, a sum of a cell-specific power parameter and a user equipment-specific power parameter, and a downlink path loss of the user equipment in the coordinated multi-points transmission environment; and
  the second obtaining unit is further configured to obtain the transmit power control command of the user equipment in the coordinated multi-points transmission environment in the following manner:

$$f(i)^* = PL_1 + \frac{1}{n}[\gamma + \delta + I] - C,$$

wherein, f(i)* is the transmit power control command of the user equipment in the coordinated multi-point transmission environment, $PL_1$ is a downlink path loss of the serving cell, n is the number of cells serving for the user equipment, γ is the sum of the reception signal to interference plus noise ratio of each access point serving for the user equipment, δ is a sum of a each difference between a downlink path loss of each coordinated cell serving for the user equipment and the downlink path loss of the serving cell, and I is the sum of strength of the interference signal on the signal that the user equipment sends to the access point of each cell,
  wherein $C=10\log_{10}(M_{PUSCH}(i))+P^*_{O\_PUSCH}(j)+\alpha(j) \cdot PL^*$, wherein $M_{PUSCH}(i)$ is the number of resource blocks allocated to the user equipment, $P^*_{O\_NOMINAL\_PUSCH}(j)$ is a cell-specific power parameter the value of which is the smallest among cell-specific power parameters of all cells serving the user equipment, α(j) is a cell-specific parameter, PL* is the downlink path loss of the user equipment in the coordinated multi-point transmission environment, i is a subframe number, and j is a control variable.

19. The base station according to claim 16, wherein:
the base station further comprises: a providing unit, configured to provide the user equipment with the uplink transmit power control parameter of the user equipment in the coordinated multi-point transmission environment after the second obtaining unit obtains the uplink transmit power control parameter, or provide the user equipment with the difference between the uplink transmit power control parameter of the serving cell of the user equipment and the uplink transmit power control parameter of the user equipment in the coordinated multi-point transmission environment after the second obtaining unit obtains the difference between the uplink transmit power control parameter of the serving cell serving for the user equipment and the uplink transmit power control parameter of the user equipment in the coordinated multi-point transmission environment.

* * * * *

UNITED STATES PATENT AND TRADEMARK OFFICE
CERTIFICATE OF CORRECTION

PATENT NO. : 9,042,926 B2  
APPLICATION NO. : 13/475108  
DATED : May 26, 2015  
INVENTOR(S) : Dengkun Xiao et al.

Page 1 of 2

It is certified that error appears in the above-identified patent and that said Letters Patent is hereby corrected as shown below:

Claims

Claim 5, Column 33, Line 20

After "with" insert --computer--.

Claim 6, Column 33, Line 27

Delete "an base" and insert --a base--, therefor.

Claim 6, Column 34, Line 4

Delete "$P^*_{O\_NOMINAL\_PUSCH} \alpha(j)$" and insert --$P^*_{O\_NOMINAL\_PUSCH}(j)$--, therefor.

Claim 7, Column 34, Lines 43-47

Delete "$PL^* = \frac{1}{\alpha} \cdot \left\{ PL_1 - \left[ C - \frac{1}{n}(\gamma + \Delta + 1) \right] \right\}$," and insert --$PL^* = \frac{1}{\alpha(j)} \cdot \left\{ PL_1 - \left[ C - \frac{1}{n}(\gamma + \Delta + 1) \right] \right\}$--, therefor.

Claim 7, Column 34, Line 50 (Approximately)

Delete "$\Delta(j)$" and insert --$\alpha(j)$--, therefor.

Signed and Sealed this  
Twenty-fourth Day of November, 2015

Michelle K. Lee  
*Director of the United States Patent and Trademark Office*

CERTIFICATE OF CORRECTION (continued)

Claim 12, Column 37, Line 15

Delete "an coordinated" and insert --a coordinated--, therefor.

Claim 14, Column 38, Line 5

Delete "multi-poins" and insert --multi-point--, therefor.

Claim 14, Column 38, Line 32 (Approximately)

Delete "$\gamma$ is a sum of each difference" and insert --$\delta$ is a sum of each difference--, therefor.

Claim 17, Column 39, Line 58

Delete "on an signal" and insert --on a signal--, therefor.

Claim 18, Column 40, Line 57

After "$\delta$ is" delete "a".